United States Patent
Ikeda

(10) Patent No.: US 11,057,399 B2
(45) Date of Patent: Jul. 6, 2021

(54) INFORMATION PROCESSING DEVICE, INFORMATION PROCESSING SYSTEM, INFORMATION PROCESSING METHOD, AND STORAGE MEDIUM FOR INTRUSION DETECTION BY APPLYING MACHINE LEARNING TO DISSIMILARITY CALCULATIONS FOR INTRUSION ALERTS

(71) Applicant: NEC Corporation, Tokyo (JP)

(72) Inventor: Satoshi Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 860 days.

(21) Appl. No.: 15/735,244

(22) PCT Filed: Jun. 15, 2016

(86) PCT No.: PCT/JP2016/002898
§ 371 (c)(1),
(2) Date: Dec. 11, 2017

(87) PCT Pub. No.: WO2016/208159
PCT Pub. Date: Dec. 29, 2016

(65) Prior Publication Data
US 2018/0181883 A1  Jun. 28, 2018

(30) Foreign Application Priority Data

Jun. 26, 2015  (JP) .............................. JP2015-128768

(51) Int. Cl.
*H04L 29/06* (2006.01)
*G06N 20/00* (2019.01)
(Continued)

(52) U.S. Cl.
CPC .......... *H04L 63/1416* (2013.01); *G06F 11/30* (2013.01); *G06F 11/327* (2013.01);
(Continued)

(58) Field of Classification Search
None
See application file for complete search history.

(56) References Cited

U.S. PATENT DOCUMENTS

| | | | |
|---|---|---|---|
| 9,021,589 B2* | 4/2015 | Anderson | G06F 21/566 726/23 |
| 9,641,542 B2* | 5/2017 | Vasseur | H04L 63/1416 |

(Continued)

FOREIGN PATENT DOCUMENTS

| | | |
|---|---|---|
| JP | 2005-085157 A | 3/2005 |
| WO | 2009/110326 A1 | 9/2009 |

OTHER PUBLICATIONS

Tadeusz Pietraszek, "Using Adaptive Alert Classification to Reduce False Positives in Intrusion Detection", Recent Advances in Intrusion Detection (Subtitle: 7th international Symposium, RAID 2004, Sophia Antipolis, France, Sep. 15-17, 2004), 2004, pp. 102-124, Springer-Verlag Berlin Heidelberg cited in the Specification.

(Continued)

*Primary Examiner* — Alan Chen

(57) ABSTRACT

An information processing device according to the present invention includes: a dissimilarity calculator that calculates dissimilarity that is a distance between already received first alert information, and newly received second alert information; a machine learning generator that generates a classifier by applying machine learning to the first alert information, and determines a classification result by applying the classifier to the second alert information; and a determiner that sets the determination result and information indicating that presentation is unnecessary for the second alert information, when the determination result is false detection and the dissimilarity is less than a threshold value, and sets information indicating that presentation is necessary for the second alert information, when the determination result is (Continued)

true detection, or when the determination result is false detection and the dissimilarity is equal to or more than a threshold value.

10 Claims, 16 Drawing Sheets

(51) Int. Cl.
  *G06F 21/55* (2013.01)
  *G06F 11/30* (2006.01)
  *G06F 11/32* (2006.01)

(52) U.S. Cl.
  CPC .............. *G06F 21/55* (2013.01); *G06N 20/00* (2019.01); *H04L 63/0227* (2013.01); *H04L 63/1425* (2013.01); *G06F 2201/81* (2013.01)

(56) References Cited

U.S. PATENT DOCUMENTS

| | | | |
|---|---|---|---|
| 2004/0215972 A1* | 10/2004 | Sung | H04L 63/1408 726/23 |
| 2009/0164427 A1* | 6/2009 | Shields | H04N 21/44008 |
| 2010/0153316 A1* | 6/2010 | Duffield | H04L 63/1416 706/12 |
| 2012/0260342 A1* | 10/2012 | Dube | G06F 21/564 726/24 |
| 2015/0067857 A1* | 3/2015 | Symons | H04L 63/1408 726/23 |
| 2015/0128263 A1* | 5/2015 | Raugas | H04L 63/1433 726/23 |
| 2015/0254566 A1* | 9/2015 | Chandramouli | G06N 5/04 706/11 |
| 2016/0330219 A1* | 11/2016 | Hasan | G06N 5/025 |
| 2016/0366160 A1* | 12/2016 | Kapoor | H04L 63/1425 |
| 2017/0262633 A1* | 9/2017 | Miserendino | G06F 21/564 |

OTHER PUBLICATIONS

International Search Report for PCT Application No. PCT/JP2016/002898, dated Aug. 23, 2016.

English translation of Written opinion for PCT Application No. PCT/JP2016/002898.

* cited by examiner

Fig.8

| DETECTION TIME 501 | TRANSMISSION-SOURCE IP ADDRESS 502 | TRANSMISSION-DESTINATION IP ADDRESS 503 | DETECTION RULE IDENTIFIER 504 | PRESENTATION FLAG 505 | CLASSIFICATION RESULT 506 | COMMUNICATION INFORMATION 507 |
|---|---|---|---|---|---|---|
| 09:00:12 | 192.168.0.1 | 10.1.0.1 | 4 | 1 | TRUE DETECTION | ... |
| 09:00:13 | 192.168.0.2 | 10.1.0.1 | 4 | 1 | TRUE DETECTION | ... |
| 09:10:30 | 192.168.0.3 | 10.1.0.2 | 10 | 0 | FALSE DETECTION/AUTOMATIC | ... |
| 09:11:10 | 192.168.0.3 | 10.1.0.3 | 10 | 0 | FALSE DETECTION/AUTOMATIC | ... |
| 10:15:01 | 192.168.0.5 | 10.1.0.3 | 10 | 0 | FALSE DETECTION/AUTOMATIC | ... |
| 11:23:33 | 192.169.0.1 | 10.1.0.4 | 4 | 1 | | ... |

500

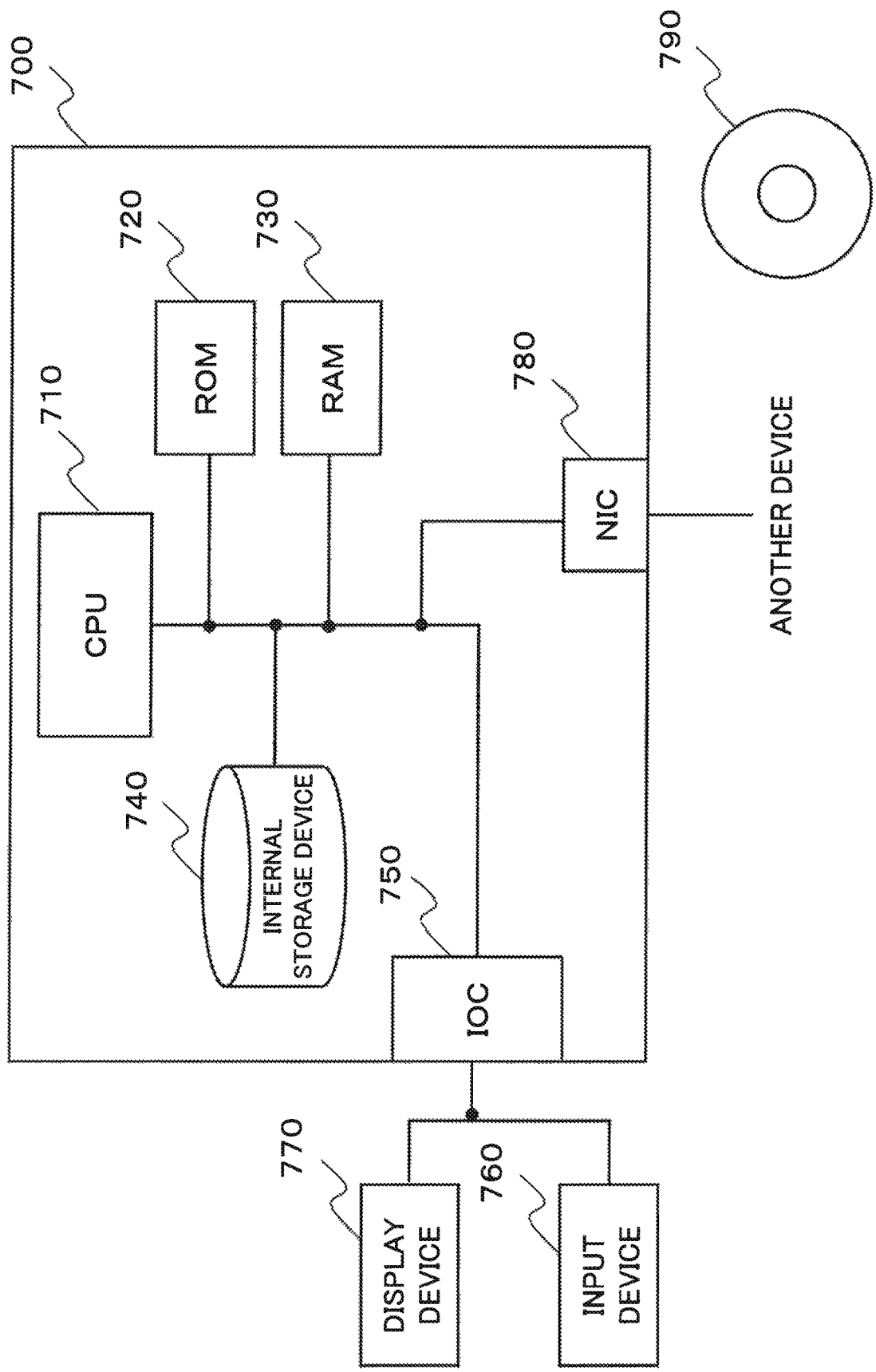

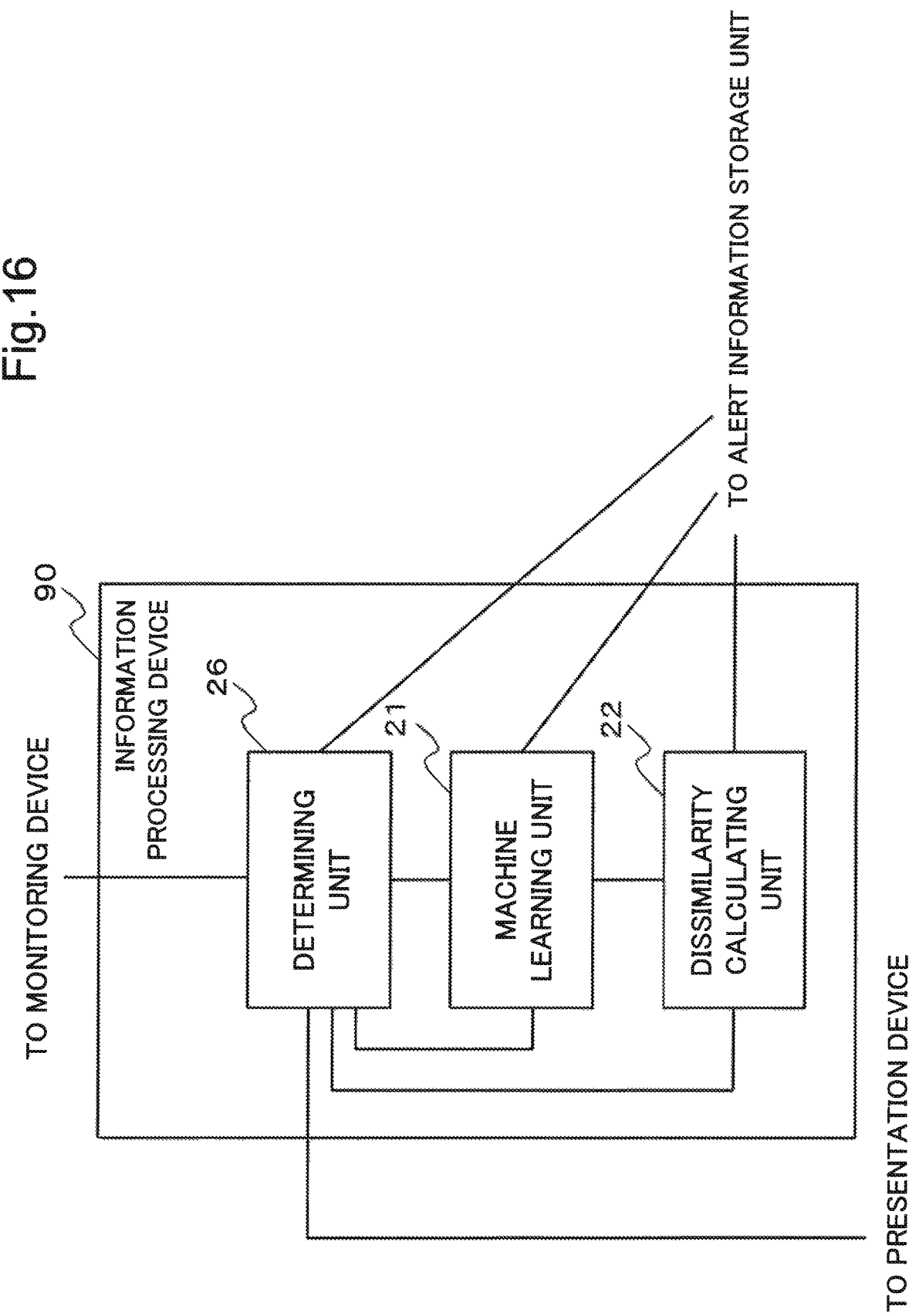

INFORMATION PROCESSING DEVICE, INFORMATION PROCESSING SYSTEM, INFORMATION PROCESSING METHOD, AND STORAGE MEDIUM FOR INTRUSION DETECTION BY APPLYING MACHINE LEARNING TO DISSIMILARITY CALCULATIONS FOR INTRUSION ALERTS

This application is a National Stage Entry of PCT/JP2016/002898 filed on Jun. 15, 2016, which claims priority from Japanese Patent Application 2015-128768 filed on Jun. 26, 2015, the contents of all of which are incorporated herein by reference, in their entirety.

TECHNICAL FIELD

The present invention relates to information communication, and particularly, relates to an information processing device, an information processing system, an information processing method, and a storage medium for monitoring communication.

BACKGROUND ART

A device for monitoring a network that communicates information monitors communication by using a firewall, an intrusion detection system (IDS), or the like and interrupts the communication as needed, in order to prevent an attack or an intrusion on a monitoring-target network. In recent years, a targeted attack aiming at theft of intellectual property or confidential information has been increasing. Thus, a demand for cybersecurity for a network is increasing. As a technique of implementing the cybersecurity, a technique of monitoring a network and dealing with an incident by using a security operation center (SOC) is commonly acknowledged.

A device for monitoring a network classifies, based on a risk, an alert detected by monitoring equipment that implements a function of a firewall, an IDS, or the like (see NPL 1, for example). Note that the alert is a message for calling an attention. For example, the alert is a message for notifying detection of an anomaly in a network.

However, the alert that the monitoring equipment generates based on detection includes an alert that does not need to be reported as an incident. For example, the alert detected by the monitoring equipment includes an alert that is low in risk, or an alert that is false detection.

Thus, an operator who carries out network monitoring work classifies an alert by referring to information as described below, specifically, information included in a detected alert or external information, and sets a risk for the alert. Then, the device for monitoring a network reports, based on the risk set by the operator, the detected alert as an alert corresponding to an incident as needed.

Note that the information that is referred to in classification described above includes, for example, a detection rule by which an alert is detected, an internet protocol (IP) address and a port number of a transmission-source host, and an IP address and a port number of a transmission-destination host. Alternatively, the information that is referred to in classification described above includes, for example, importance assigned to a detection rule used for detecting an alert by a security vender, and communication information included in communication (a packet, for example) that is a cause of detection.

A system described in NPL 1 classifies an alert. More specifically, the system described in NPL 1 uses, for classification, machine learning using alert information and aggregation information acquired from the alert information. The system described in NPL 1 processes, in an agent mode, an alert having a highly reliable classification result based on machine learning, without presenting to an operator. Based on such an operation, the system described in NPL 1 achieves more efficient processing of an operator.

However, in the system described in NPL 1, there is a risk of a false negative that an alert being true detection is determined as an alert of false detection. In view of this, the system described in NPL 1 randomly extracts alerts partially from among alerts determined unnecessary to be presented to an operator, based on a classification result using machine learning, and presents the extracted alerts to the operator. Based on such an operation, the system described in NPL 1 reduces false negatives in classification.

CITATION LIST

Non Patent Literature

[NPL 1] Tadeusz Pietraszek, "Using Adaptive Alert Classification to Reduce False Positives in Intrusion Detection", Recent Advances in Intrusion Detection (Subtitle: 7th international Symposium, RAID 2004, Sophia Antipolis, France, Sep. 15-17, 2004), pp. 102-124, 2004

SUMMARY OF INVENTION

Technical Problem

An alert having high similarity to an alert included in learning samples used for machine learning (hereinafter, such an alert will be simply referred to as a "learning alert") is highly likely to have a characteristic similar to a characteristic of the learning alert. In other words, there is a low possibility in occurrence of false negatives in an alert having high similarity to a learning alert.

Conversely, an alert having low similarity to a learning alert is highly likely to have a characteristic different from that of the learning alert. Thus, in comparison with an alert having high similarity to a learning alert, there is a higher possibility of occurrence of false negatives in an alert having low similarity to a learning alert.

Thus, it is desirable that an alert to be presented to an operator is an alert having low similarity to a learning alert.

However, extraction of an alert in the technique described above in NPL 1 is random extraction. The random extraction is extraction irrelevant to machine learning. In the technique described in NPL 1, an alert is extracted as an alert to be presented to an operator, without consideration of similarity to a learning alert. In other words, the system described in NPL 1 may have a case where an improper alert is presented as an alert to be presented to an operator.

As described above, the technique described in NPL 1 has an issue that a proper alert cannot be presented to an operator.

An object of the present invention is to provide an information processing device, an information processing system, an information processing method, and a storage medium that solve the above-described problem and generate alert information that can be properly presented to an operator.

Solution to Problem

An information processing device according to one aspect of the present invention includes: a dissimilarity calculator that calculates dissimilarity that is a distance between first alert information including an already received first alert and information relevant to the first alert, and second alert information including a newly received second alert and information relevant to the second alert; a machine learning generator that generates a classifier that determines a classification result that is a determination result of classification relating to detection of the first alert information by applying machine learning to the first alert information, and determines a classification result by applying the classifier to the second alert information; and a determiner that sets the determination result for the classification result of the second alert information and sets information indicating that presentation is unnecessary for information indicating presentation of the second alert information, when the determination result is false detection indicating erroneous detection and the dissimilarity is less than a predetermined threshold value, and sets information indicating that presentation is necessary for information indicating presentation of the second alert information, when the determination result is true detection indicating correct detection, or when the determination result is false detection indicating erroneous detection and the dissimilarity is equal to or more than a predetermined threshold value.

An information processing system according one aspect of the present invention includes:

the above information processing device; and a presentation device. The presentation device that includes an alert display that receives the first alert information from the information processing device and displays the classification result and the first alert information, and an inputter that receives an input to the classification result in the displayed alert information and transmits the input to the information processing device.

An information processing method according to one aspect of the present invention includes: calculating dissimilarity that is a distance between first alert information including an already received first alert and information relevant to the first alert, and second alert information including a newly received second alert and information relevant to the second alert; generating a classifier that determines a classification result that is a determination result of classification relating to detection of the first alert information by applying machine learning to the first alert information; determining a classification result by applying the classifier to the second alert information; setting the determination result for the classification result of the second alert information and setting information indicating that presentation is unnecessary for information indicating presentation of the second alert information, when the determination result is false detection indicating erroneous detection and the dissimilarity is less than a predetermined threshold value; and setting information indicating that presentation is necessary for information indicating presentation of the second alert information, when the determination result is true detection indicating correct detection, or when the determination result is false detection indicating erroneous detection and the dissimilarity is equal to or more than a predetermined threshold value.

A computer readable non-transitory storage medium according to one aspect of the present invention embodying a program. The program causes a computer to perform a method. The method includes: calculating dissimilarity that is a distance between first alert information including an already received first alert and information relevant to the first alert, and second alert information including a newly received second alert and information relevant to the second alert; generating a classifier that determines a classification result that is a determination result of classification relating to detection of the first alert information by applying machine learning to the first alert information; determining a classification result by applying the classifier to the second alert information; setting the determination result for the classification result of the second alert information and setting information indicating that presentation is unnecessary for information indicating presentation of the second alert information, when the determination result is false detection indicating erroneous detection and the dissimilarity is less than a predetermined threshold value; and setting information indicating that presentation is necessary for information indicating presentation of the second alert information, when the determination result is true detection indicating correct detection, or when the determination result is false detection indicating erroneous detection and the dissimilarity is equal to or more than a predetermined threshold value.

Advantageous Effects of Invention

Based on the present invention, an advantageous effect of generating alert information that can be properly presented to an operator can be exhibited.

BRIEF DESCRIPTION OF DRAWINGS

FIG. 8 is a diagram illustrating an example of alert information for use in description of the first example embodiment;

FIG. 15 is a block diagram illustrating an example of a configuration of an information processing device according to a modification example; and FIG. 16 is a block diagram illustrating an example of a configuration of an information processing device according to a modification example.

DESCRIPTION OF EMBODIMENTS

Figure 1:
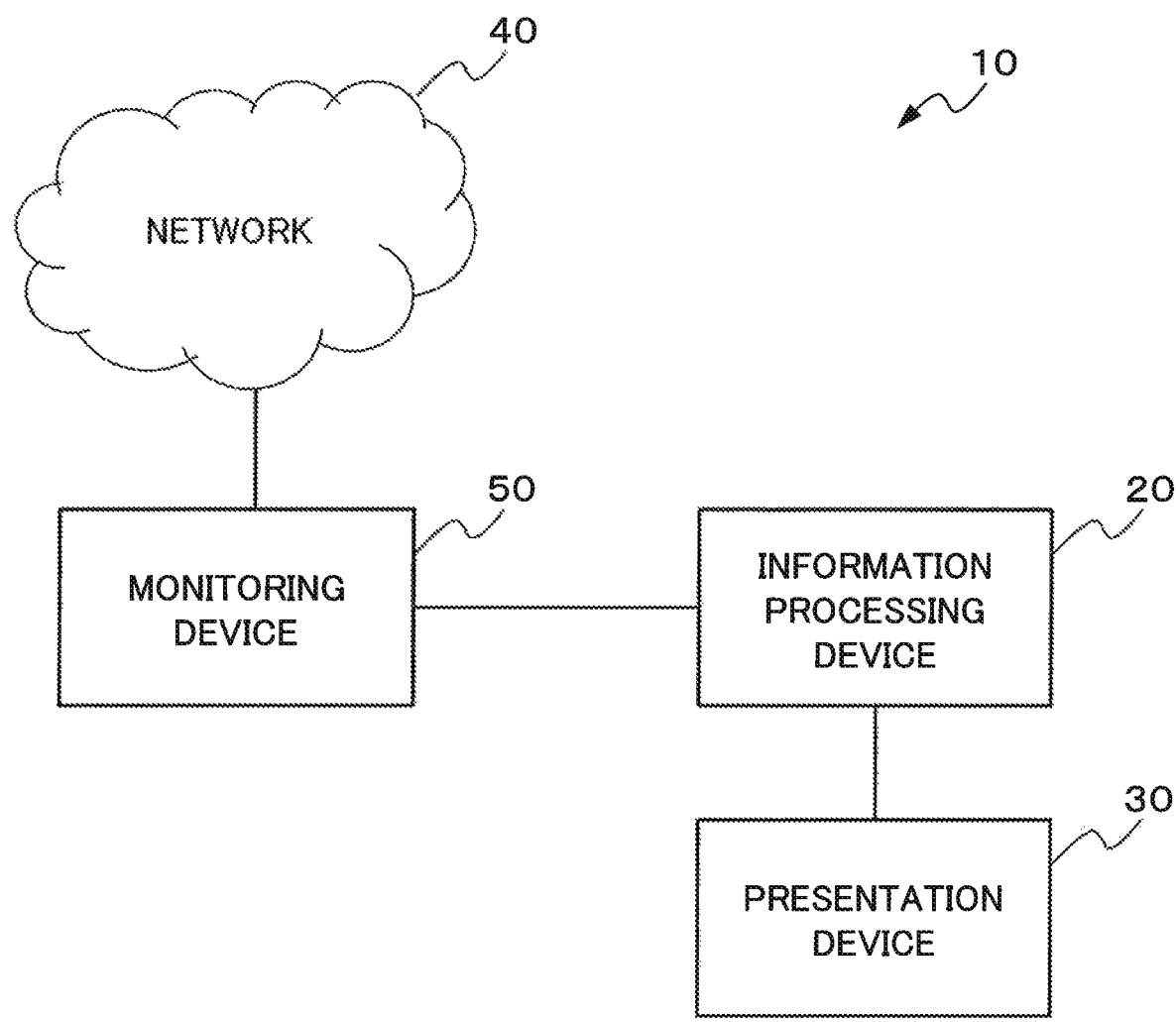
FIG. 1 is a block diagram illustrating an example of a configuration of an information processing system that includes an information processing device according to a first example embodiment of the present invention.

Next, example embodiments of the present invention will be described in detail with reference to the drawings.

The respective drawings are for describing the example embodiments of the present invention. However, the present invention is not limited to the description of the drawings. In addition, like components are assigned with like numerals throughout the drawings, and repeated description therefor may be omitted.

In addition, the drawings used in the following description may omit description for a configuration of a part unrelated to the description of the present invention, and may not illustrate the configuration.

Prior to describing each of the example embodiments, alert information for use in the following description will be described.

"Alert information" is information that includes an alert (an alert includes information relating to communication that is a cause of the alert) and information relevant to the alert (a result of determination of the alert, for example).

FIG. 8 is a diagram illustrating an example of alert information 500 for use in the following description. In FIG. 8, each row indicates each piece of the alert information 500.

As illustrated in FIG. 8, the alert information 500 includes a detection time 501, a transmission-source internet protocol (IP) address 502, a transmission-destination IP address 503, a detection rule identifier 504, a presentation flag 505, a classification result 506, and communication information 507.

In the alert information 500, the detection time 501, the transmission-source IP address 502, the transmission-destination IP address 503, the detection rule identifier 504, and the communication information 507 are pieces of information relating to communication that is a cause of an alert. In other words, a monitoring device for monitoring a monitoring-target network transmits, as an alert, these pieces of information to an information processing device according to each of the example embodiments.

Note that information included in an alert to be transmitted to the information processing device need not to be limited to these. An alert may include other information. For example, an alert may include transmission-source and transmission-destination port numbers. In addition, an alert may not include part of the above-described pieces of information.

Further, the presentation flag 505 and the classification result 506 are pieces of information relevant to the alert.

Next, each piece of information included in the alert information 500 illustrated in FIG. 8 will be described.

The detection time 501 is a time at which the monitoring device detects an alert.

The transmission-source IP address 502 is an address of a transmission-source device (a transmission-source host, for example) in communication that is a cause of the alert.

The transmission-destination IP address 503 is an address of a transmission-destination device (a transmission-destination host, for example) in communication that is a cause of the alert.

The detection rule identifier 504 is an identifier for identifying a rule used when the monitoring device detects the alert.

The communication information 507 is communicated information in communication causing alert. The communication information 507 is, for example, a byte string included as a payload of a packet used in communication, a hyper text transfer protocol (HTTP) request, or a character string included in an HTTP response.

The presentation flag 505 is information representing whether or not a presentation device needs to present the alert information 500 to an operator. As will be described later, a machine learning unit of the information processing device according to each of the example embodiments sets a value of the presentation flag 505. Note that the value of the presentation flag 505 is not limited to a particular value. Thus, in the following description, it is assumed that a value of "1" in the presentation flag 505 indicates that presentation to an operator is necessary, and that a value of "0" in the presentation flag 505 indicates that presentation to an operator is unnecessary. In other words, the machine learning unit of each information processing device sets "1 (Necessary)" for the presentation flag 505 when presentation to an operator is necessary, and sets "0 (Unnecessary)" for the presentation flag 505 when presentation to an operator is unnecessary. It is assumed that an initial value of the presentation flag 505 is "1 (Necessary)".

The classification result 506 is information on classification of alert detection. In other words, the classification result 506 is information indicating whether the alert information 500 is correctly detected or erroneously detected. The classification result 506 may further include information indicating a subject that executes the classification. For example, a result of classification carried out by the information processing device to be described below may include information indicating the fact that the information processing device carried out the classification (hereinafter, referred to as "/Automatic").

Thus, in the following description, it is assumed that any one of values indicating "True detection", "False detection", "False detection/Automatic", and "Blank (indicating uninput or unset)" is set for the classification result 506. The classification result 506 may include the above-described value as a numerical value, or may include the above-described value as a value other than a numerical value (a character string, for example). An initial value of the classification result 506 is "Blank".

However, the information processing device according to each of the example embodiments may include, regarding "True detection", processing of eliminating necessity of determination of others. In this case, the classification result 506 includes information corresponding to "True detection/Automatic".

Note that information included in the alert information 500 need not to be limited to the above-described information. The alert information 500 may include other information. Alternatively, the alert information 500 may not include part of the information as long as an operation to be described below can be achieved.

First Example Embodiment

First, a configuration according to a first example embodiment of the present invention will be described.
[Description of Configuration]
FIG. 1 is a block diagram illustrating an example of a configuration of an information processing system 10 that includes an information processing device 20 according to the first example embodiment of the present invention.

As illustrated in FIG. 1, the information processing system 10 includes the information processing device 20, a presentation device 30, network 40, and a monitoring device 50.

The network 40 is a monitoring target in the present example embodiment, in other words, in the information processing system 10. The network 40 according to the present example embodiment is not limited to a particular network. For example, the network 40 may be an intracompany network for limited use within a predetermined range. Alternatively, the network 40 is not limited to a physical network, but may be a logical network such as a virtual local area network (VLAN). Thus, detailed description of the network 40 will be omitted.

The monitoring device 50 monitors the communication information 507 in the network 40. In addition, the monitoring device 50 detects, based on a predetermined detection rule, an anomaly of communication occurring in the network 40. The anomaly of communication occurring in the network 40 herein is, for example, an anomaly occurring due to an attack on the network 40 from outside or an operation of the network 40. Then, the monitoring device 50 notifies the information processing device 20 of a detection result (the detected anomaly) as an alert. The monitoring device 50 according to the present example embodiment is not limited to a particular device, but is a generally used device for monitoring the network 40. Thus, detailed description of the monitoring device 50 will be omitted.

The presentation device 30 presents, to an operator of the information processing system 10, information (the alert information 500, for example) analyzed by the information processing device 20. In addition, the presentation device 30 transmits an instruction from the operator to the information processing device 20. The instruction herein is, for example, a determination result of the alert information 500 (a value to be set for the classification result 506, for example).

Figure 3:
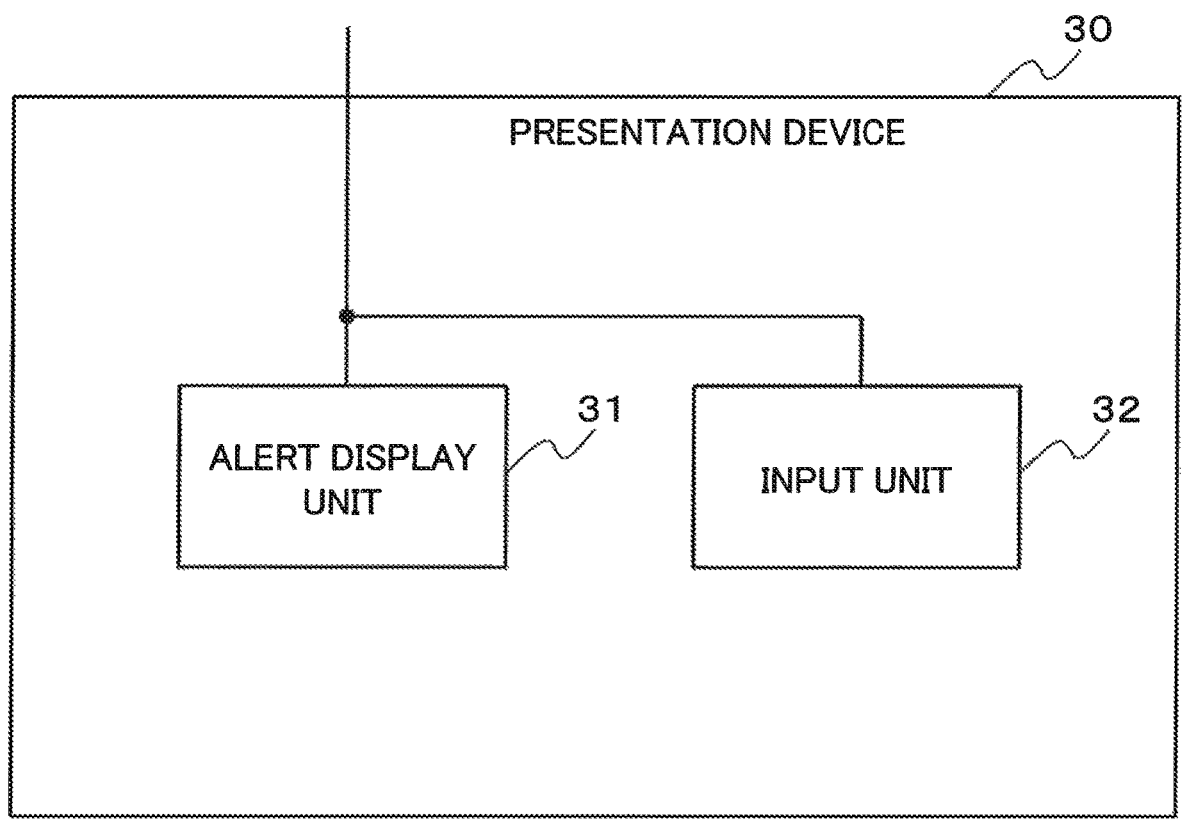
FIG. 3 is a block diagram illustrating an example of a configuration of a presentation device according to the first example embodiment.

FIG. 3 is a block diagram illustrating an example of a configuration of the presentation device 30 according to the first example embodiment.

As illustrated in FIG. 3, the presentation device 30 includes an alert display unit 31 and an input unit 32.

The alert display unit 31 receives, from the information processing device 20, information (the alert information 500, for example) stored by the information processing device 20. Then, the alert display unit 31 displays the received information (the alert information 500, for example).

Note that the information displayed by the alert display unit 31 is information for an operator to input an instruction to the input unit 32. Thus, the alert display unit 31 may display other information in addition to the information received from the information processing device 20. Alternatively, the alert display unit 31 may not display information unnecessary for determination of an operator. Further, the alert display unit 31 may display information by selecting the information to be displayed, based on information (the presentation flag 505, the classification result 506, or the detection time 501, for example) included in the information received from the information processing device 20.

The input unit 32 receives an input (instruction) from an operator, and transmits the input to the information processing device 20. The input of an operator herein is information instructing change of information (the classification result 506, for example) included in the alert information 500. For example, the input unit 32 receives an input of the classification result 506 (true detection or false detection) that is a result of determination of an operator with respect to the alert information 500 displayed by the alert display unit 31.

Then, the input unit 32 transmits the received input (instruction) of an operator to the information processing device 20.

Note that, as will be described later in detail, the information processing device 20 stores information (instruction) received from the presentation device 30 in the alert information 500. For example, when the information processing device 20 receives the classification result 506 from the presentation device 30, the information processing device 20 stores a value of the received classification result 506 in the classification result 506 of an alert information storage unit 23, which will be described later.

Next, the information processing device 20 according to the first example embodiment will be described with reference to the drawings.

Figure 2:
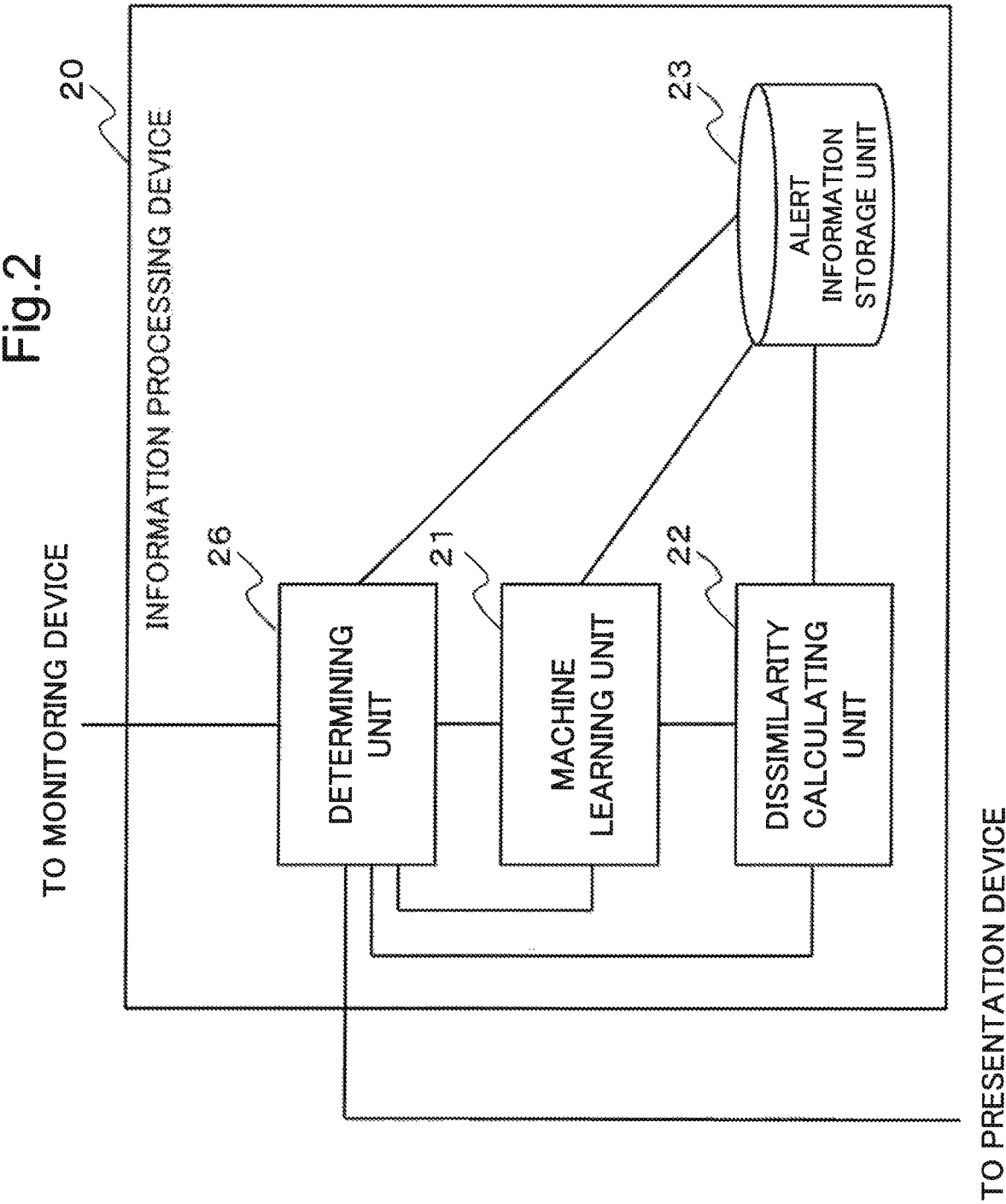
FIG. 2 is a block diagram illustrating an example of a configuration of the information processing device according to the first example embodiment.

FIG. 2 is a block diagram illustrating an example of a configuration of the information processing device 20 according to the first example embodiment.

As illustrated in FIG. 2, the information processing device 20 includes a machine learning unit 21, a dissimilarity calculating unit 22, the alert information storage unit 23, and a determining unit 26.

The determining unit 26 receives an alert detected by the monitoring device 50, and stores the received alert and information (in other words, the "alert information 500") relevant to the alert in the alert information storage unit 23. Hereinafter, the alert information 500 corresponding to an alert (a latest alert) newly received from the monitoring device 50 is defined as "alert information (A)" when being distinguished from other alert information 500. Hereinafter, the alert information 500 excluding the alert information (A) may be referred to as first alert information. In addition, the alert information (A) may be referred to as second alert information. Note that, when receiving a new alert, the determining unit 26 notifies each configuration that the alert is received as needed.

Further, the determining unit 26 updates a value of the alert information 500 based on a result of determination in the machine learning unit 21 and dissimilarity calculated by the dissimilarity calculating unit 22, which will be described later.

In addition, the determining unit 26 receives a request from the above-described presentation device 30, and transmits information relating to the request to the presentation device 30. Further, the determining unit 26 receives information from the presentation device 30, and stores the received information in the alert information storage unit 23.

The machine learning unit 21 executes machine learning about the classification result 506 of the alert information 500. More specifically, the machine learning unit 21 executes machine learning by using, as a learning sample for the machine learning, the alert information 500 in which the classification result 506 is not blank (uninput or unset) among pieces of the alert information 500 stored in the alert information storage unit 23. In other words, the machine learning unit 21 executes machine learning of the classification result 506 by using the already set classification result 506. Further, when the classification result 506 is stored information ("/Automatic") indicating classification carried out by the own device, the machine learning unit 21 may exclude the classification result 506 classified by the own device from the learning sample. Then, the machine learning unit 21 determines, based on the machine learning, whether the alert information 500 is true detection or false detection.

As already described, the determining unit 26 stores a result of determination of the machine learning unit 21 in the classification result 506 of the alert information 500 stored in the alert information storage unit 23. When information ("/Automatic") indicating that classification is carried out by the own device is stored in the classification result 506, the determining unit 26 stores the classification result 506 by including, in a determination result, the information ("/Automatic") indicating that the classification is carried out by the own device. Note that, as already described, the information processing device 20 according to the present example embodiment stores the classification result 506 (in other words, "False detection/Automatic") indicating that setting is carried out by the own device with respect to false detection.

The dissimilarity calculating unit 22 calculates dissimilarity between the alert information (A) newly received by the information processing device 20 and part or all pieces of the alert information 500 stored in the alert information storage unit 23. The calculation of dissimilarity in the dissimilarity calculating unit 22 will be described later in detail.

The alert information storage unit 23 stores the alert information 500.

[Description of Operation]

Next, an operation of the information processing device 20 according to the present example embodiment will be described in detail with reference to the drawings.

First, an operation of machine learning in the information processing device 20 will be described with reference to the drawings.

Figure 4:
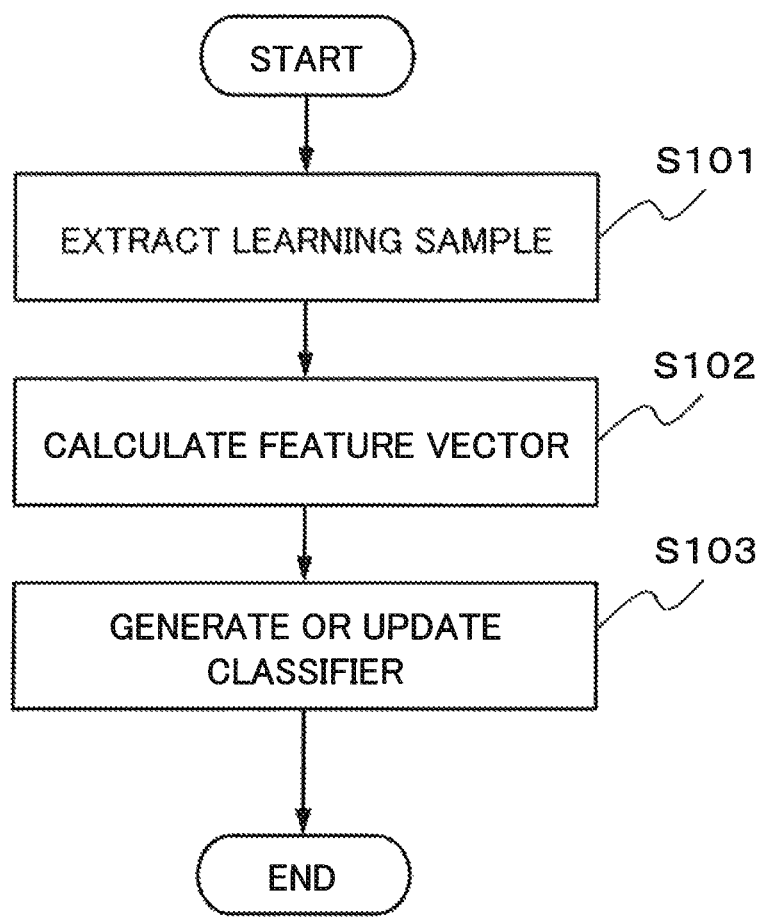
FIG. 4 is a flowchart illustrating an example of an operation of machine learning in a machine learning unit according to the first example embodiment.

FIG. 4 is a flowchart illustrating an example of an operation of machine learning in the machine learning unit 21 according to the first example embodiment.

The machine learning unit 21 first extracts the alert information 500 to be used as a learning sample from among pieces of the alert information 500 stored in the alert information storage unit 23 (Step S101). As already described, it is desirable that the alert information 500 to be used as a learning sample is the alert information 500 for which the classification result 506 is set based on other than the information processing device 20. For example, the information processing device 20 uses, as a learning sample, the alert information 500 to be set the alert information 500 received from an operator. Thus, a learning sample in the description of the present example embodiment is the alert information 500 in which the classification result 506 is "True detection" or "False detection".

Next, the machine learning unit 21 calculates a feature vector based on the learning sample (Step S102). The "feature vector" herein is a vector containing information for comparing dissimilarity as elements. In addition, the feature vector is normally a multidimensional vector calculated from a learning sample. One feature vector is calculated for one learning sample.

As a method of calculating a feature vector, many methods are proposed. The machine learning unit 21 may use a general method of calculating a feature vector, as a method of calculating a feature vector for use in the present example embodiment. For example, the machine learning unit 21 may use a feature vector that is calculated by using a section of an IP address, a section of a host, a detection rule identifier, or the number of alerts belonging to an identical section within a fixed time width included in the alert information 500, which are described in NPL 1. Alternatively, the machine learning unit 21 may convert the communication information 507 included in the alert information 500 into a vector format, and may use the vector-format communication information 507 as a feature vector. Note that the machine learning unit 21 may count, for example, N-gram's frequency of appearance in order to convert the communication information 507 into a vector format.

However, the above-described feature vectors are examples of feature vectors that the machine learning unit 21 can use. The above description is not intended to limit a feature vector available in the machine learning unit 21 according to the present example embodiment to the above-described feature vectors. The machine learning unit 21 can use, as a feature vector, a value acquired by applying information included in the alert information 500 to mechanical calculation processing. In addition, the machine learning unit 21 may use the above-described feature vectors in combination.

The machine learning unit 21 executes machine learning by using the classification result 506 in the learning sample as a supervised signal. Then, the machine learning unit 21 generates or updates a classifier as a result of the machine learning (Step S103). The machine learning unit 21 can use a general machine learning algorithm as the machine learning herein. For example, the machine learning unit 21 may use decision tree learning, a support vector machine, or ensemble learning.

The classifier generated by the machine learning unit 21 determines whether the alert information 500 relating to the feature vector is true detection or false detection by using the feature vector.

Note that the machine learning unit 21 may use any of batch learning and sequential learning when a learning algorithm in use permits.

When employing batch learning, the machine learning unit 21 executes processing of the above-described machine learning at a predetermined timing or a predetermined time interval, and generates or updates a classifier.

When employing sequential learning, the machine learning unit 21 generates or updates a classifier at a timing when the classification result 506 of the alert information 500 stored by the alert information storage unit 23 is changed.

Next, an operation of calculating dissimilarity in the information processing device 20 will be described with reference to the drawings.

Figure 5:
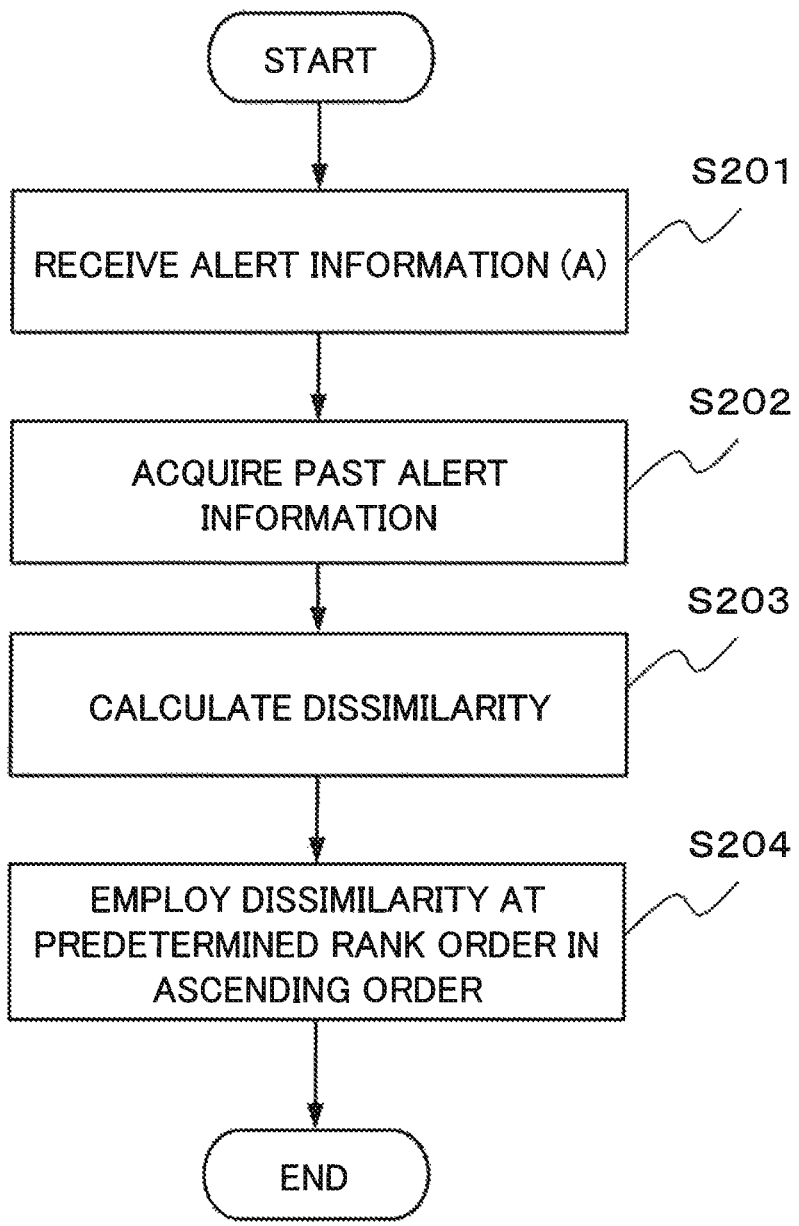
FIG. 5 is a flowchart illustrating an example of an operation of dissimilarity calculation in a dissimilarity calculating unit according to the first example embodiment.

FIG. 5 is a flowchart illustrating an example of an operation of dissimilarity calculation in the dissimilarity calculating unit 22 according to the first example embodiment.

The dissimilarity calculating unit 22 starts an operation at a timing of receiving the alert information (A) for a new alert (Step S201). Specifically, the determining unit 26 receives an alert from the monitoring device 50, generates the alert information 500 (the alert information (A)) by adding necessary information thereto, and stores the generated information as the alert information 500 in the alert information storage unit 23. Then, the determining unit 26 notifies the dissimilarity calculating unit 22 that the new alert is received. The dissimilarity calculating unit 22 acquires, based on this notification, the alert information (A) stored in the alert information storage unit 23.

Next, the dissimilarity calculating unit 22 acquires, from the alert information storage unit 23, other alert information 500 other than the alert information (A), in other words, the alert information 500 to be a comparison target (Step S202). Note that the alert information 500 excluding the alert information (A) is the alert information 500 that is previous to the alert information (A). In other words, the alert information 500 to be a comparison target is past (already stored) alert information 500.

Note that the dissimilarity calculating unit 22 may acquire all pieces of the alert information 500 stored in the alert information storage unit 23. Alternatively, the dissimilarity calculating unit 22 may acquire part of pieces of the alert information 500 stored in the alert information storage unit 23. For example, the dissimilarity calculating unit 22 may acquire the alert information 500 detected by using the same detection rule as the detection rule used for detecting the alert information (A). Specifically, the dissimilarity calculating unit 22 may acquire the alert information 500 including the detection rule identifier 504 having the same value as that of the detection rule identifier 504 of the alert information (A). Alternatively, the dissimilarity calculating unit 22 may acquire the alert information 500 in which the classification result 506 included in the alert information 500 has a predetermined value ("True detection" or "False detection", for example).

Next, the dissimilarity calculating unit 22 calculates dissimilarity between the alert information (A) and each piece of the extracted past alert information 500 (Step S203).

The "dissimilarity" herein is a degree of separation between the alert information (A) and each piece of the extracted alert information 500. More specifically, the "dissimilarity" is a value equivalent to a distance between the alert information (A) and each piece of the extracted alert information 500. When the distance is large, the dissimilarity increases.

The dissimilarity calculating unit 22 can use various distances as the dissimilarity. The dissimilarity calculating unit 22 may use, for example, a distance between feature vectors calculated based on the alert information 500 used by the machine learning unit 21 described above. Alternatively, the dissimilarity calculating unit 22 may use, as the dissimilarity, an edit distance between pieces of the communication information 507 included in respective pieces of the alert information 500. However, the above-described dissimilarity is an example of dissimilarity according to the present example embodiment. The dissimilarity according to the present example embodiment is not limited to the above.

After calculating dissimilarity to each piece of the alert information 500, the dissimilarity calculating unit 22 selects dissimilarity at a predetermined rank order (K) among pieces of the calculated dissimilarity arranged in ascending order. Then, the dissimilarity calculating unit 22 defines the selected dissimilarity as dissimilarity between the alert information (A) and the past alert information 500 (Step S204). In other words, the dissimilarity calculating unit 22 employs, as dissimilarity of the alert information (A) corresponding to the newly received alert, dissimilarity at the predetermined rank order (K) among pieces of the calculated dissimilarity in ascending order. In other words, the dissimilarity of the alert information (A) is dissimilarity to the past alert information 500 equivalent to a k-nearest neighbor of the alert information (A). Note that the predetermined rank order (K) is a value set in advance in the dissimilarity calculating unit 22.

Next, an operation of analyzing the alert information 500 in the information processing device 20 will be described with reference to the drawings.

Figure 6:
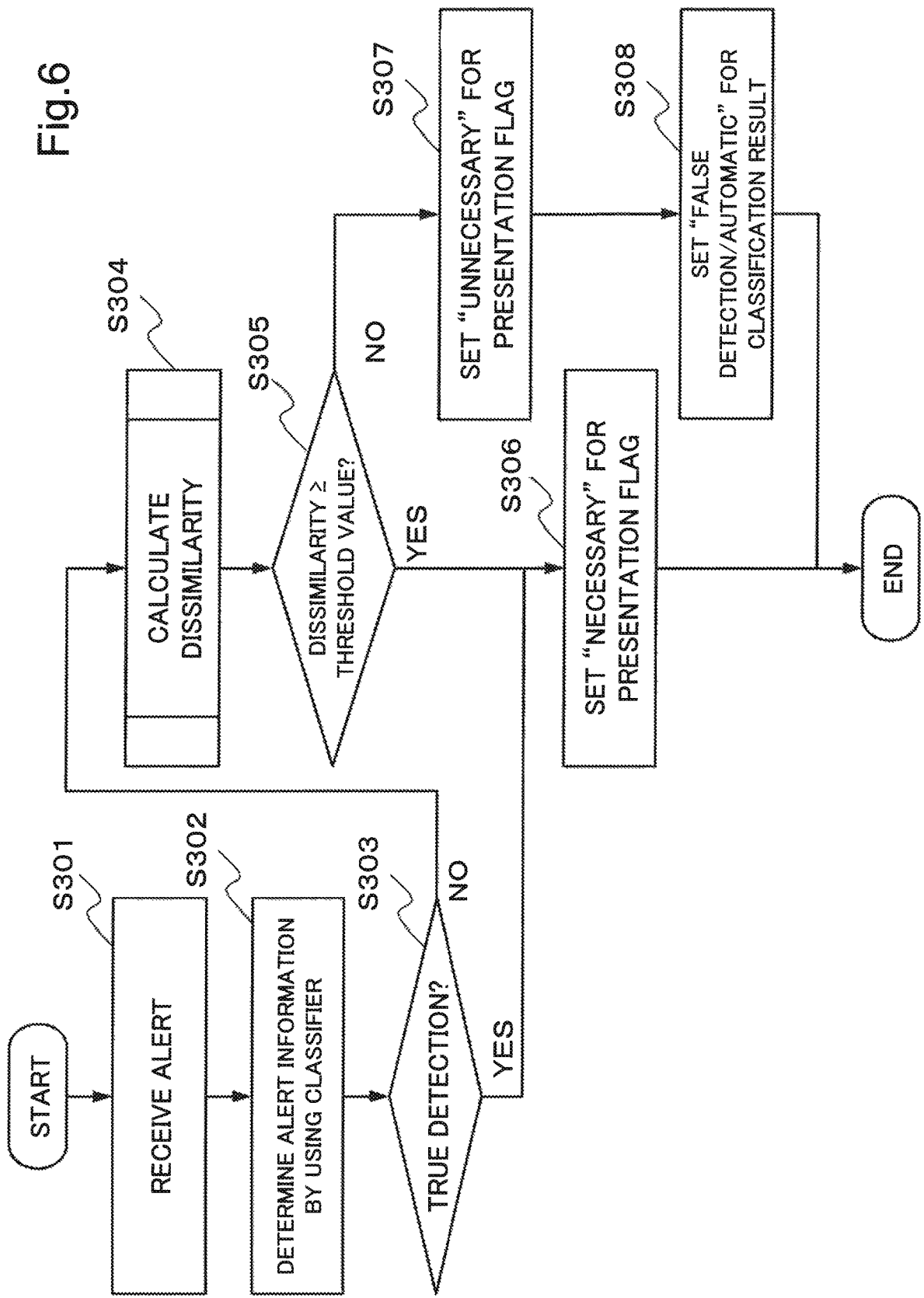
FIG. 6 is a flowchart illustrating an example of an operation of updating alert information in a determining unit according to the first example embodiment.

FIG. 6 is a flowchart illustrating an example of an operation of updating the alert information 500 in the determining unit 26 according to the present example embodiment.

Upon newly receiving an alert, the determining unit 26 starts an operation below (Step S301). Note that, upon receiving an alert, the determining unit 26 generates the alert information 500 (in this case, the alert information (A)) corresponding to the alert, and stores the generated alert information 500 in the alert information storage unit 23. Then, the determining unit 26 executes an operation below on the stored alert information 500. In other words, the determining unit 26 executes an operation to be described below on the above-described alert information (A). Thus, hereinafter, description will be given by using the alert information (A).

The determining unit 26 first determines the alert information (A) by using a classifier generated by the machine learning unit 21, which has been described by using FIG. 4 (Step S302). More specifically, the determining unit 26 determines as follows by using the classifier.

First, the determining unit 26 calculates a feature vector based on the alert information (A). This operation is an operation similar to that in Step S102 illustrated in FIG. 4. Thus, the determining unit 26 may request the machine learning unit 21 to calculate a feature vector. Next, the determining unit 26 inputs the calculated feature vector to the classifier. Then, the determining unit 26 acquires, as an output of the classifier, a determination result (true detection or false detection) of the alert information (A). Note that the determining unit 26 may also request the machine learning unit 21 for processing of determination of a feature vector using the classifier, in addition to calculation of the feature vector. In other words, the machine learning unit 21 may execute Step S302 in the information processing device 20.

Then, the determining unit 26 determines whether or not the determination result of the classifier is true detection (Step S303).

When the result of determination of the classifier is true detection (YES at Step S303), the determination of the classifier needs determination of an operator. Thus, the determining unit 26 sets "1 (Necessary)" for the presentation flag 505 of the alert information (A) (Step S306).

When the result is determined as false detection (NO at Step S303), the determining unit 26 acquires dissimilarity of the alert information (A) calculated by the dissimilarity calculating unit 22, which has been described with reference to FIG. 5 (Step S304).

Then, the determining unit 26 determines whether or not the dissimilarity is equal to or more than a predetermined threshold value (Step S305). Note that the threshold value used herein is a value set in advance in the determining unit 26.

When the dissimilarity is equal to or more than the predetermined threshold value (YES in S305), the determination of the classifier needs determination of an operator. Thus, the determining unit 26 sets "1 (Necessary)" for the presentation flag 505 (Step S306).

When the dissimilarity is less than the predetermined threshold value (NO at Step S305), the determination of the classifier does not need determination of an operator. Thus, the determining unit 26 sets "0 (Unnecessary)" for the presentation flag 505 (Step S307). Further, the determining unit 26 sets the classification result 506 to "False detection/

Automatic", in order to indicate that determination of false detection is (mechanically) made by the own device (Step S308).

Next, an operation of classifying the alert information 500 in the information processing system 10 that includes the information processing device 20 will be described with reference to the drawings.

Figure 7:
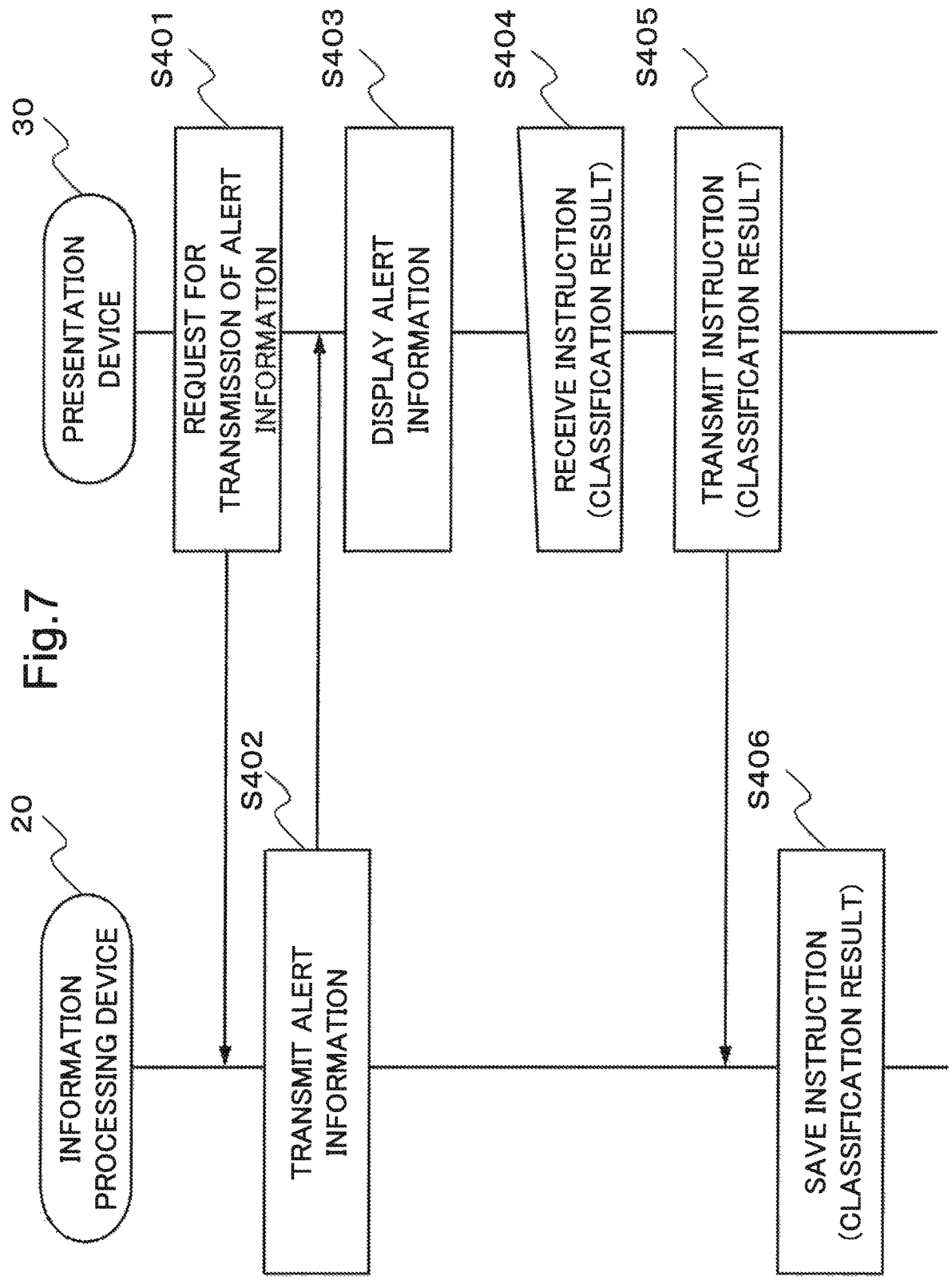
FIG. 7 is a sequence diagram illustrating an example of an operation of setting a classification result for alert information in the information processing system according to the first example embodiment.

FIG. 7 is a sequence diagram illustrating an example of an operation of saving the classification result 506 in the alert information 500 in the information processing system 10 according to the present example embodiment.

The alert display unit 31 of the presentation device 30 requests the information processing device 20 to transmit the alert information 500 (S401).

The determining unit 26 of the information processing device 20 transmits, based on the request from the alert display unit 31, the alert information 500 stored in the alert information storage unit 23 to the presentation device 30 (S402).

The alert display unit 31 of the presentation device 30 presents the received alert information 500 (S403). The alert display unit 31 may display all pieces of the received alert information 500. However, for clearer display, it is desirable that the alert display unit 31 select, as the alert information 500 to be displayed, the alert information 500 in which the presentation flag 505 is "1 (Necessary)", and display the selected alert information 500. Further, it is desirable that the alert display unit 31 select the alert information 500 for which determination of an operator is not set, specifically, the alert information 500 in which the classification result 506 is "Blank", and display the selected alert information 500. For example, in the case of the alert information 500 illustrated in FIG. 8, it is desirable that the alert display unit 31 displays the alert information 500 on the sixth row.

In this way, the presentation device 30 is able to display the proper alert information 500 to an operator, based on the alert information 500 generated by the information processing device 20.

Note that the machine learning unit 21 of the information processing device 20 may transmit the alert information 500 satisfying the above-described condition.

After displaying the alert information 500, the input unit 32 of the presentation device 30 receives an instruction (true detection or false detection) for the displayed alert information 500 from the operator (S404).

Then, the input unit 32 transmits the received instruction (true detection or false detection) to the information processing device 20 (S405).

The determining unit 26 of the information processing device 20 sets (stores) the received instruction for the alert information 500 stored in the alert information storage unit 23 (S406).

[Description of Advantageous Effects]

Next, an advantageous effect of the present example embodiment will be described.

The information processing device 20 according to the first example embodiment can exhibit an advantageous effect of generating the alert information 500 that can be properly presented to an operator.

The reason is as follows.

The machine learning unit 21 of the information processing device 20 according to the present example embodiment generates a classifier used for classifying the alert information 500, based on machine learning. In addition, the dissimilarity calculating unit 22 calculates dissimilarity between the received alert information (A) and the past alert information 500. Then, the determining unit 26 determines whether or not presentation of the alert information 500 to an operator is necessary based on the classification result 506 based on the classifier and the dissimilarity, and sets a determination result for the presentation flag 505 of the alert information 500.

When the alert information 500 generated by the information processing device 20 is used, the presentation device 30 that presents the alert information 500 to an operator is able to use the presentation flag 505, in addition to the classification result 506 based on the classifier generated by the machine learning unit 21. In other words, the presentation device 30 is able to select the alert information 500 to be presented, based on the presentation flag 505 in addition to the classification result 506. More specifically, based on the presentation flag 505, the presentation device 30 is able to present the alert information 500 to an operator by selecting the alert information 500 having low similarity to the past alert information 500.

In this way, the information processing device 20 facilitates selection of the alert information 500 having a characteristic different from that of the past alert information 500.

Therefore, the information processing system 10 that includes the information processing device 20 is able to acquire the classification result 506 with respect to the alert information 500 having a characteristic different from that of the past alert information 500. As a result, the information processing system 10 is able to reduce occurrence of false negatives in the alert information 500.

Second Example Embodiment

A second example embodiment of the present invention executes re-determination in order to enhance accuracy.

Next, an information processing device 60 according to the present example embodiment will be described with reference to the drawings.

[Description of Configuration]

First, a configuration of the information processing device 60 will be described with reference to the drawings.

Figure 9:
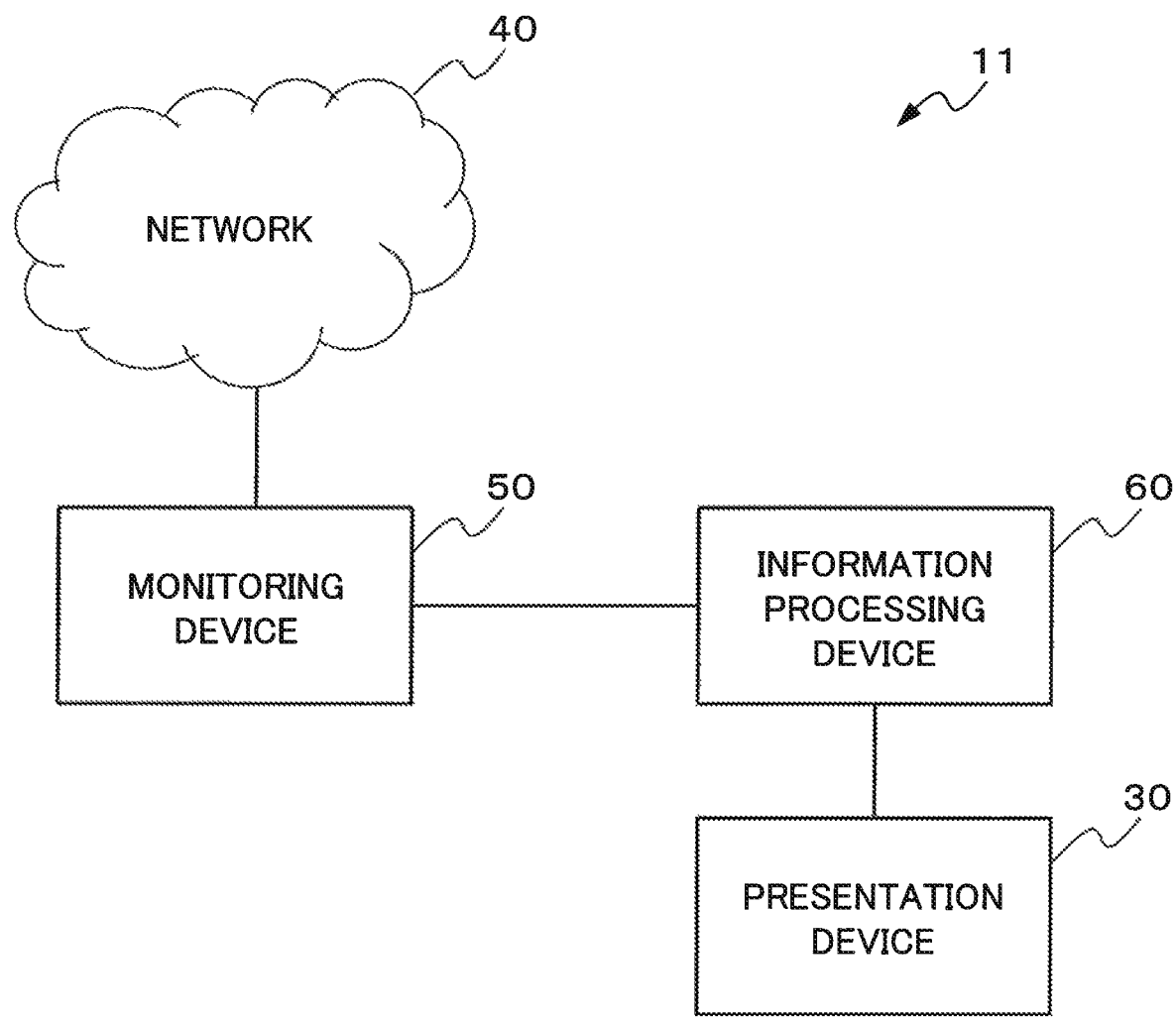
FIG. 9 is a block diagram illustrating an example of a configuration of an information processing system that includes an information processing device according to a second example embodiment.

FIG. 9 is a block diagram illustrating an example of a configuration of an information processing system 11 that includes the information processing device 60 according to the second example embodiment. As illustrated in FIG. 9, when compared with the information processing system 10 according to the first example embodiment, the information processing system 11 is different in that the information processing device 60 is included in place of the information processing device 20. Thus, description about a configuration and an operation similar to those in the first example embodiment will be omitted, and a configuration and an operation relevant to the present example embodiment will be described.

Figure 10:
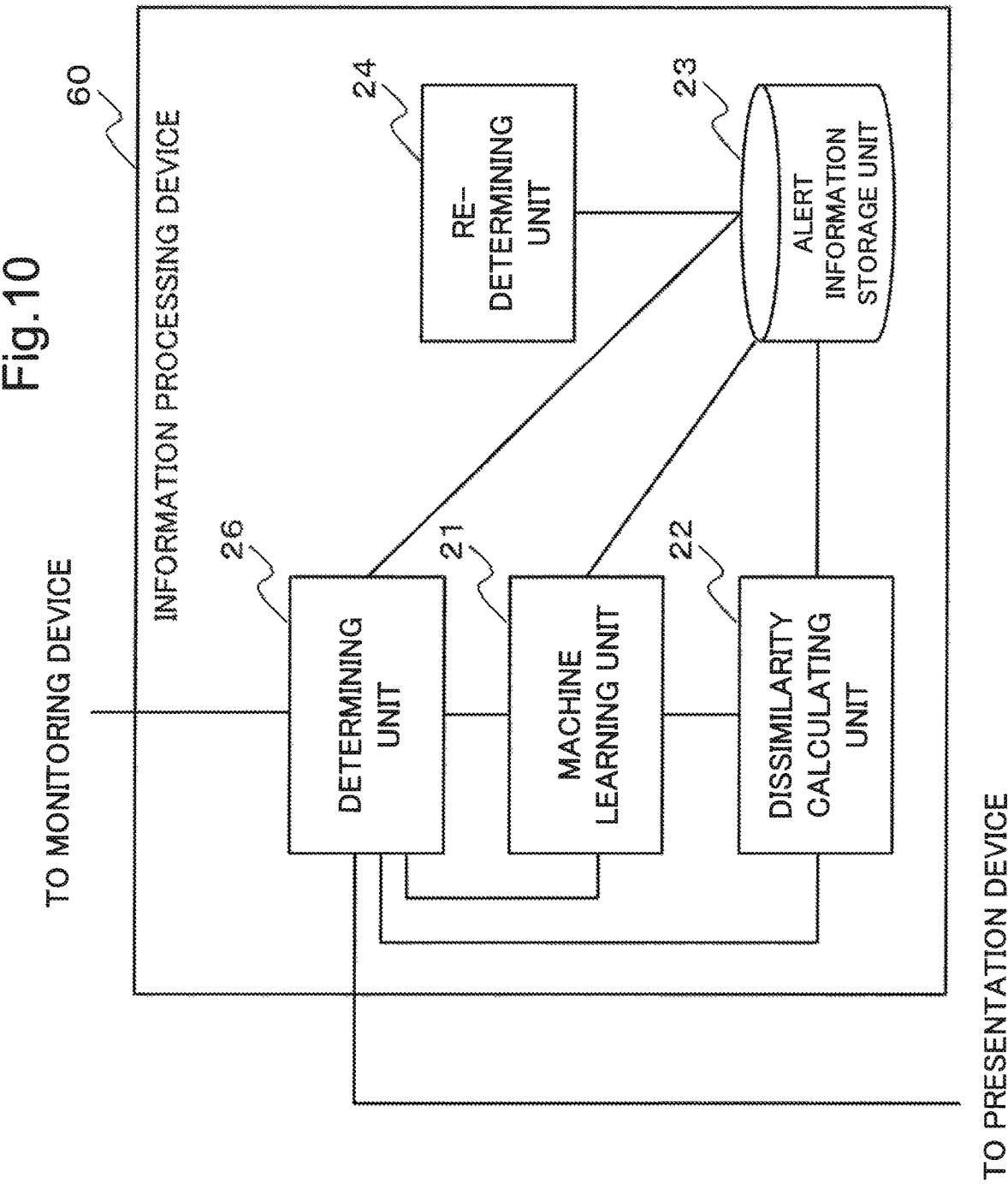
FIG. 10 is a block diagram illustrating an example of a configuration of the information processing device according to the second example embodiment.

FIG. 10 is a block diagram illustrating an example of a configuration of the information processing device 60 according to the second example embodiment. As illustrated in FIG. 10, the information processing device 60 includes a re-determining unit 24, in addition to the configuration of the information processing device 20 according to the first example embodiment. Thus, detailed description of a configuration and an operation similar to those in the first example embodiment will be omitted, and a configuration and an operation specific to the present example embodiment will be mainly described.

The re-determining unit 24 re-determines the alert information 500 stored in the alert information storage unit 23 by using the classifier generated (updated) by the machine learning unit 21.

[Description of Operation]

Next, an operation of the re-determining unit 24 will be described with reference to the drawings.

Figure 11:
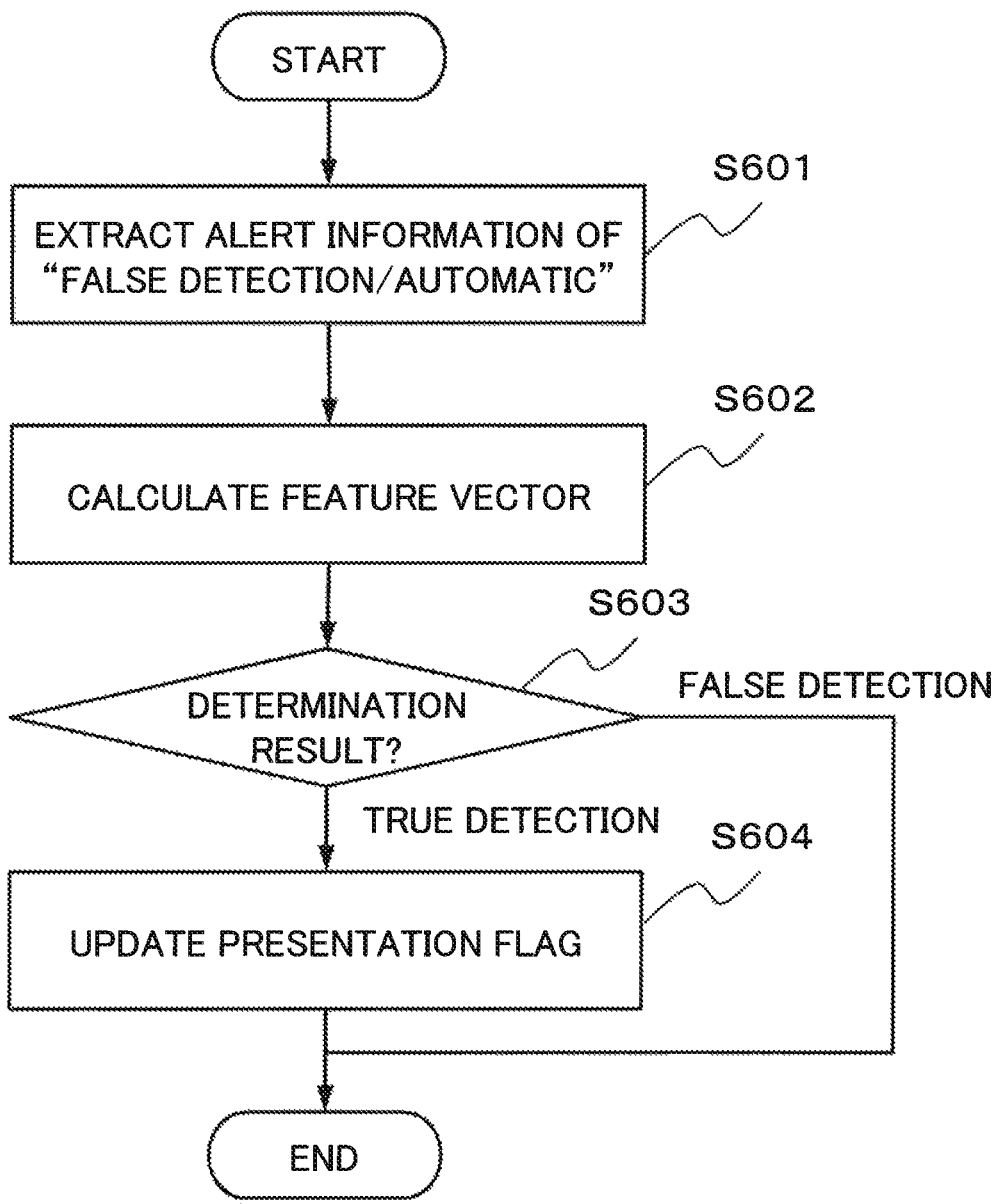
FIG. 11 is a flowchart illustrating an example of an operation of a re-determining unit according to the second example embodiment.

FIG. 11 is a flowchart illustrating an example of an operation of the re-determining unit 24 according to the second example embodiment.

The re-determining unit 24 first extracts, from among pieces of the alert information 500 stored in the alert information storage unit 23, the alert information 500 in which the classification result 506 is "False detection/Automatic" (Step S601). In other words, the re-determining unit 24 treats, as a processing target, the alert information 500 classified as false detection by the own device. In other words, the re-determining unit 24 extracts the alert information 500 for which the classification result 506 is to be re-determined. This alert information 500 for which the classification result 506 is to be re-determined may be referred to as third alert information.

Next, the re-determining unit 24 calculates a feature vector for the extracted alert information 500 (Step S602).

Then, the re-determining unit 24 applies the calculated feature vector to an updated classifier, and acquires a determination result. In other words, the re-determining unit 24 re-determines the feature vector by using an updated classifier (Step S603).

Then, when the result it determined as "True detection" ("True detection determination" at Step S603), the re-determining unit 24 updates the presentation flag 505 of the alert information 500 to "1 (Necessary)" (Step S604). Note that a determining unit 26 may be configured to include the re-determining unit 24 in such a way as to integrate with the function regarding the alert information 500.

When the result is determined "False detection" ("False detection" at Step S603), the re-determining unit 24 does not update the presentation flag 505 of the alert information 500.

In this way, the information processing device 60 updates the presentation flag 505, based on the operation of the re-determining unit 24.

As a result, the information processing device 60 is able to transmit, to a presentation device 30, the alert information 500 for which the presentation flag 505 is updated. The alert display unit 31 of the presentation device 30 displays, to an operator, the alert information 500 determined as "True detection" after updating. Then, similarly to the first example embodiment, the information processing device 20 is able to receive, from the presentation device 30, an instruction of the operator with respect to the alert information 500 after updating.

As already described, the machine learning unit 21 updates a classifier. Accordingly, the information processing device 60 is able to update the classification result 506 by using the updated classifier. Thus, the information processing device 60 is able to set the classification result 506 more accurately in comparison with the information processing device 20.

Note that, in the description hitherto, the re-determining unit 24 treats, as a target of re-determination, the alert information 500 in which the classification result 506 is "False detection/Automatic". However, the re-determining unit 24 may further limit the target alert information 500. When there are a large number of pieces of the target alert information 500 to be re-determined, the re-determining unit 24 requires a large amount of time for calculation processing of re-determination. Thus, the re-determining unit 24 may treat, as a target of re-determination, the alert information 500 detected at a predetermined time or after by using the detection time 501 included in the alert information 500, for example.

Note that, when executing re-determination, the machine learning unit 21 may exclude the classification result 506 classified by the own device from a learning sample in machine learning. This is because there is a case where it is desirable for the machine learning unit 21 to avoid re-reference of a determination result (a classification result) based on machine learning of the own device in re-determination.

[Description of Advantageous Effects]

The information processing device 60 according to the present example embodiment can exhibit an advantageous effect of achieving determination with higher accuracy, in addition to the advantageous effect of the first example embodiment.

The reason is as follows.

The re-determining unit 24 included in the information processing device 60 according to the present example embodiment re-determines the alert information 500 classified as false detection by the own device, by using an updated classifier. The updated classifier is generated in a state where learning samples in the machine learning unit 21 are expanded. Accordingly, the updated classifier is expected to have improved accuracy of classification in comparison with a previous classifier. Thus, the classification result 506 that is re-determination of the re-determining unit 24 using the updated classifier is determination with higher accuracy, in comparison with the classification result 506 using a previous classifier.

Third Example Embodiment

A method of calculating dissimilarity in the information processing device 20 is not necessarily limited to the already described method.

For example, the information processing device 20 may use information representing a characteristic of the alert information 500 as a method of calculating dissimilarity. In view of this, a case in which statistical information (particularly, distribution information) of the alert information 500 is used as a characteristic of the alert information 500 will be described as a third example embodiment.

[Description of Configuration]

First, a configuration of the present example embodiment will be described with reference to the drawings.

Figure 12:
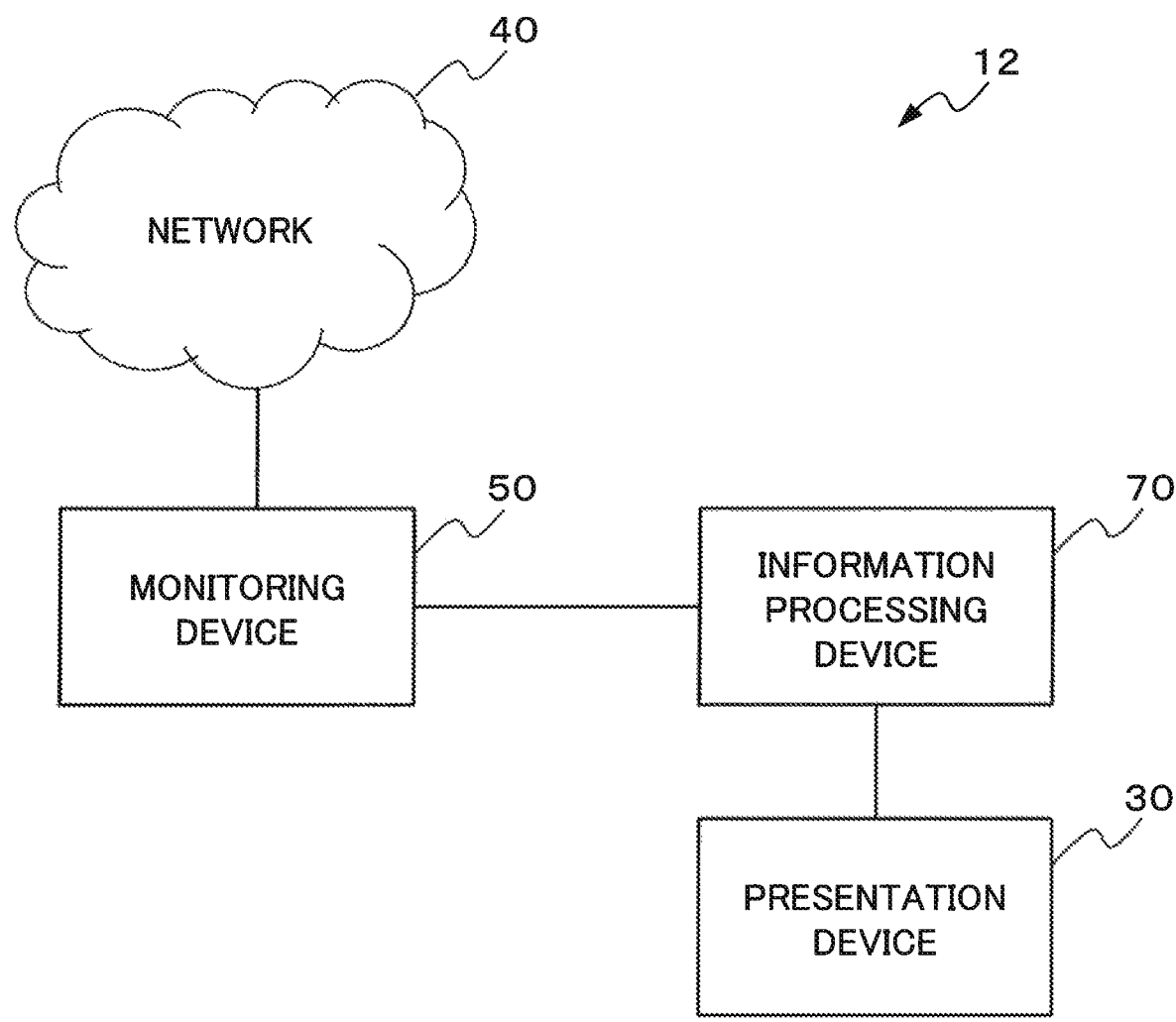
FIG. 12 is a block diagram illustrating an example of a configuration of an information processing system that includes an information processing device according to a third example embodiment.

FIG. 12 is a block diagram illustrating an example of a configuration of an information processing system 12 that includes an information processing device 70 according to the third example embodiment. As illustrated in FIG. 12, when compared with the information processing system 10 according to the first example embodiment, the information processing system 12 is different in that the information processing device 70 is included in place of the information processing device 20. Thus, description about a configuration and an operation similar to those in the first example embodiment will be omitted, and a configuration and an operation relevant to the present example embodiment will be described.

Figure 13:
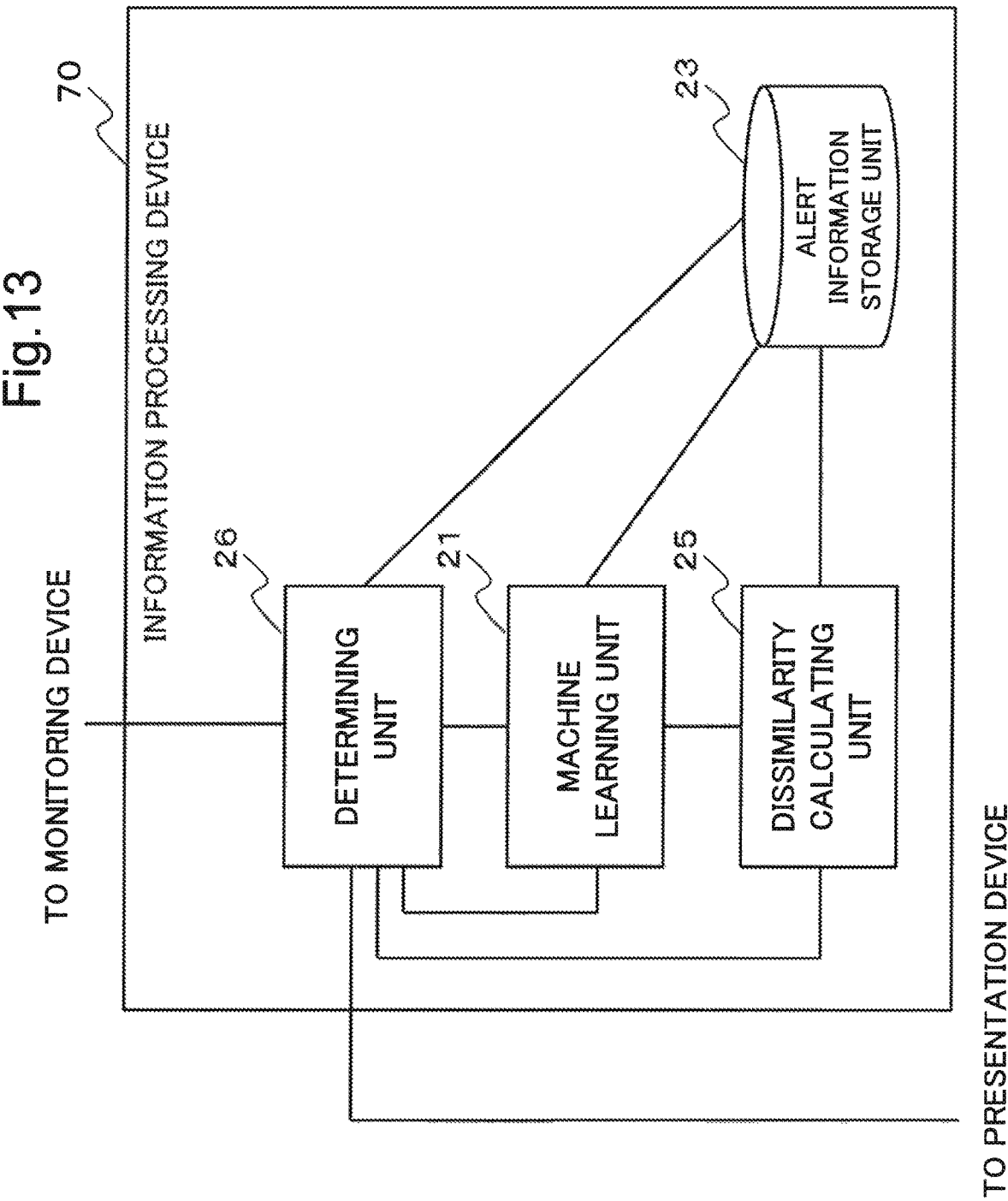
FIG. 13 is a block diagram illustrating an example of a configuration of the information processing device according to the third example embodiment.

FIG. 13 is a block diagram illustrating an example of a configuration of the information processing device 70 according to the third example embodiment. As illustrated in FIG. 13, when compared with the information processing device 20 according to the first example embodiment, the information processing device 70 is different in that a dissimilarity calculating unit 25 is included in place of the dissimilarity calculating unit 22. Thus, detailed description of a configuration and an operation similar to those in the first example embodiment will be omitted, and a configuration and an operation specific to the present example embodiment will be described. In other words, the dissimilarity calculating unit 25 will be described.

The dissimilarity calculating unit 25 calculates, similarly to the dissimilarity calculating unit 22, dissimilarity between the alert information (A) corresponding to a newly received alert and the past alert information 500. However, the dissimilarity calculating unit 25 uses a different scheme from the dissimilarity calculating unit 22 for calculation of dissimilarity. In other words, the dissimilarity calculating unit 25 calculates distribution information of a feature vector calculated based on the alert information 500, and calculates dissimilarity for the feature vector calculated based on the alert information (A) by using the calculated distribution information.

The distribution information herein is information summarizing distribution of the alert information 500 on a feature vector space. For example, when it is assumed that distribution of information is (multidimensional) normal distribution, the dissimilarity calculating unit 25 is able to calculate, based on a mean ($\mu$) and a variance (or a covariance matrix ($\Sigma$)) in the distribution, a relationship of information on an evaluation target for the normal distribution. Here, the relationship calculated by the dissimilarity calculating unit 25 is, for example, a Mahalanobis's distance that indicates a degree of deviation (dissimilarity).

In view of the above, when it is assumed that distribution of the alert information 500 is (multidimensional) normal distribution, the dissimilarity calculating unit 25 needs to obtain a mean ($\mu$) and a covariance matrix ($\Sigma$) of the alert information 500 as distribution information. Note that the feature vector in this description may be, for example, the already described feature vector in machine learning according to the first example embodiment, but is not necessarily limited to this. For example, the feature vector in this description may be a histogram (H).

Note that, when the calculated distribution information is used for the following operation of calculating dissimilarity, the dissimilarity calculating unit 25 according to the present example embodiment may store the calculated distribution information in a not-illustrated storage unit.

[Description of Operation]

Next, an operation of the dissimilarity calculating unit 25 will be described in detail with reference to the drawings.

Figure 14:
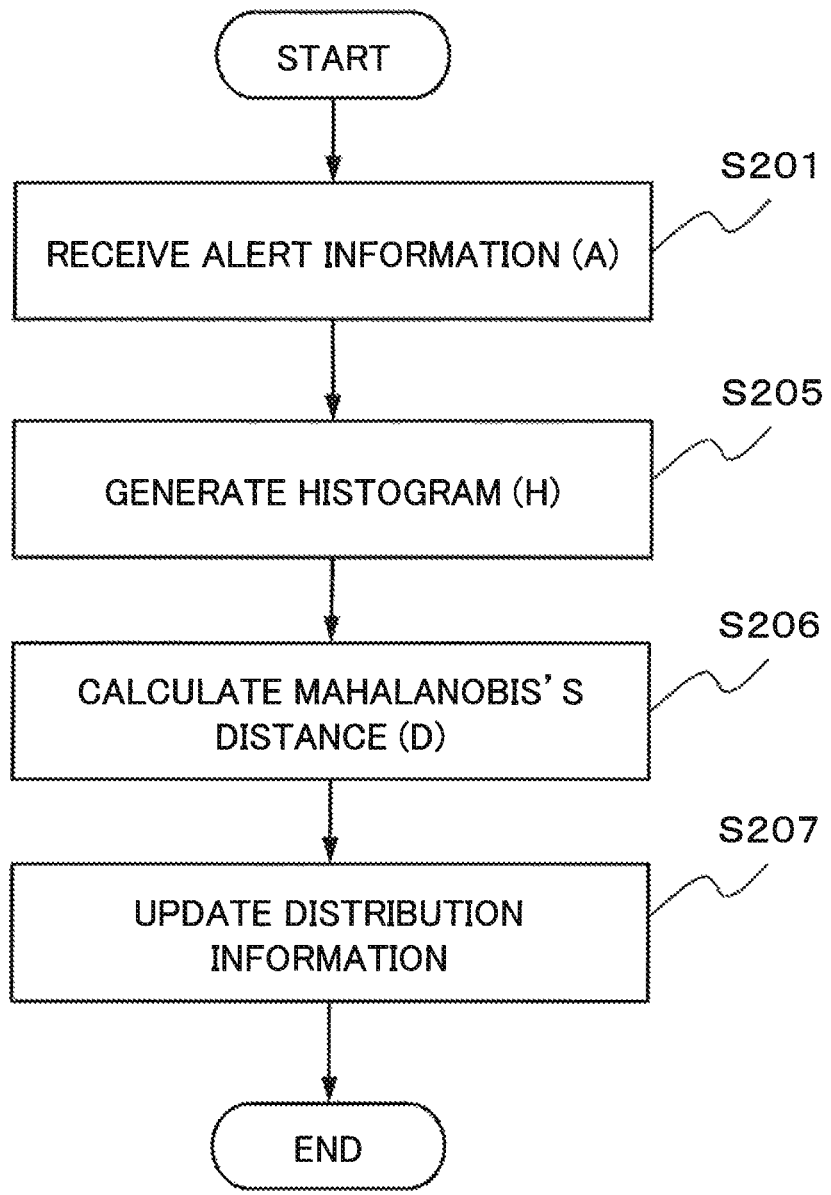
FIG. 14 is a flowchart illustrating an example of an operation of a dissimilarity calculating unit according to the third example embodiment.

FIG. 14 is a flowchart illustrating an example of an operation of the dissimilarity calculating unit 25 according to the third example embodiment.

Note that distribution information used by the dissimilarity calculating unit 25 according to the present example embodiment is not limited to particular information. The distribution information is a parameter for determining distribution such as a mean or a variance, for example.

However, in the following description, it is assumed that the dissimilarity calculating unit 25 uses, as distribution information, a mean value ($\mu$) and a variance-covariance matrix ($\Sigma$) in a histogram (H) representing the number of appearance of a character string included in the communication information 507 of the alert information (A). In addition, it is assumed that the dissimilarity calculating unit 25 has already calculated and stored distribution information (the mean value ($\mu$) and the variance-covariance matrix ($\Sigma$)) for the past alert information 500.

In addition, it is assumed that the dissimilarity calculating unit 25 uses a Mahalanobis's distance (D) as an example of a distance.

As illustrated in FIG. 14, the dissimilarity calculating unit 25 starts an operation at a timing of receiving the alert information (A), similarly to the dissimilarity calculating unit 22 (Step S201).

The dissimilarity calculating unit 25 generates a histogram (H) for a character string included in the communication information 507 of the alert information (A) (Step S205).

Next, the dissimilarity calculating unit 25 calculates a Mahalanobis's distance (D) by using the generated histogram (H) and distribution information (a mean value ($\mu$) and a variance-covariance matrix ($\Sigma$)) for the stored past alert information 500 (Step S206). The Mahalanobis's distance (D) calculated herein is dissimilarity in the present example embodiment.

Then, the dissimilarity calculating unit 25 updates, by using the generated histogram (H), the distribution information (the mean value ($\mu$) and the variance-covariance matrix ($\Sigma$)) for the past alert information 500 (Step S207).

In this way, upon receiving the alert information (A), the dissimilarity calculating unit 25 according to the present example embodiment updates distribution information used for calculating dissimilarity. Based on this updating, the dissimilarity calculating unit 25 is able to approximately calculate a variance-covariance matrix ($\Sigma$) for the past alert information 500.

Note that the information processing device 70 may include a function equivalent to the re-determining unit 24 according to the second example embodiment.

In addition, the dissimilarity calculating unit 25 uses, as dissimilarity, a histogram (H) of the communication information 507 included in the alert information 500 in the description of the present example embodiment hitherto.

However, this is not intended to limit the present example embodiment. The dissimilarity calculating unit 25 may use other information as information representing a characteristic of the alert information 500. For example, the dissimilarity calculating unit 25 estimates probability distribution for the communication information 507, based on the communication information 507 of the past alert information 500. Then, the dissimilarity calculating unit 25 may use, as dissimilarity, lowness of occurrence probability of the alert information (A) in the estimated probability distribution.

The information (distribution information, for example) representing a characteristic of the alert information 500 is information summarizing pieces of the alert information 500. Thus, the number of pieces of the information representing a characteristic of the alert information 500 is generally less than the number of pieces of the alert information 500. Accordingly, the dissimilarity calculating unit 25 processes less amount of information in comparison with the dissimilarity calculating unit 22. As a result, the dissimilarity calculating unit 25 can reduce processing cost in comparison with the dissimilarity calculating unit 22.

[Description of Advantageous Effects]

Next, an advantageous effect of the information processing device 70 according to the present example embodiment will be described.

The information processing device 70 according to the third example embodiment can exhibit an advantageous effect of efficiently calculating dissimilarity, in addition to the advantageous effect of the first example embodiment.

The reason is as follows.

The dissimilarity calculating unit 22 of the information processing device 20 according to the first example embodiment is required to calculate dissimilarity between the alert information (A) and each of a plurality of pieces of the alert information 500.

In contrast to this, the dissimilarity calculating unit 25 according to the present example embodiment calculates dissimilarity of the alert information (A) by using distribution information for the past alert information 500. The distribution information for the past alert information 500 herein is information summarizing a plurality of pieces of the alert information 500 into a smaller number of pieces of information. In other words, the dissimilarity calculating unit 25 calculates dissimilarity of the alert information (A) by using less information in comparison with the alert information 500.

Modification Examples

The information processing device 20, the information processing device 60, and the information processing device 70 (hereinafter, described collectively as the information processing device 20) described above are configured as follows.

For example, each of the configuration units of the information processing device 20 may be configured with a hardware circuit.

In addition, the information processing device 20 may be configured to include the configuration units by using a plurality of not-illustrated devices connected through a network. For example, the information processing device 20 may be configured to include the alert information storage unit 23 as a not-illustrated external storage device.

FIG. 16 is a block diagram illustrating an example of a configuration of an information processing device 90 according to a first modification example of the information processing device 20.

The information processing device 90 is configured to include an alert information storage unit 23 as a not-illustrated external storage device connected through a network and the like.

Thus, the information processing device 90 includes a machine learning unit 21, a dissimilarity calculating unit 22, and a determining unit 26.

The information processing device 90 configured as above can acquire an advantageous effect similar to that of the information processing device 20.

The reason is that the configurations included in the information processing device 90 can operate similarly to the configurations of the information processing device 20 by using the alert information storage unit 23 provided in an external storage device.

Note that the information processing device 90 is a minimum configuration of the example embodiment of the present invention.

Further, the information processing device 20 may be configured to include a plurality of configuration units with one piece of hardware.

Alternatively, the information processing device 20 may be implemented as a computer device that includes a central processing unit (CPU), a read only memory (ROM), and a random access memory (RAM). The information processing device 20 may be implemented as a computer device that further includes, in addition to the above-described configurations, an input/output circuit (IOC) and a network interface circuit (NIC).

FIG. 15 is a block diagram illustrating an example of a configuration of an information processing device 700 according to a second modification example of the information processing device 20. In other words, FIG. 15 is a block diagram illustrating an example of a configuration of the information processing device 700 that is an example when the information processing device 20 is implemented as the above-described computer device.

The information processing device 700 includes a CPU 710, a ROM 720, a RAM 730, an internal storage device 740, an IOC 750, and an NIC 780, and configures a computer.

The CPU 710 reads a program from the ROM 720. Then, the CPU 710 controls the RAM 730, the internal storage device 740, the IOC 750, and the NIC 780, based on the read program. Then, the computer including the CPU 710 controls these configurations, and implements the functions as the machine learning unit 21, the dissimilarity calculating unit 22, and the determining unit 26, which are illustrated in FIG. 2.

The CPU 710 may use the RAM 730 or the internal storage device 740 as a temporary memory for a program when implementing the functions.

Alternatively, the CPU 710 may read a program included in a storage medium 790 that stores the program in a computer-readable way, by using a not-illustrated storage medium reading device. Alternatively, the CPU 710 may receive a program from a not-illustrated external device via the NIC 780, store the program in the RAM 730, and operate based on the stored program.

The ROM 720 stores a program to be executed by the CPU 710 and fixed data. The ROM 720 is a programmable-ROM (P-ROM) or a Flash ROM, for example.

The RAM 730 temporarily stores a program to be executed by the CPU 710 and data. The RAM 730 is a dynamic-RAM (D-RAM), for example.

The internal storage device 740 stores a program and data to be stored over a long term by the information processing device 700. In addition, the internal storage device 740 may operate as a temporary storage device of the CPU 710. The internal storage device 740 operates as the alert information storage unit 23. The internal storage device 740 is a hard disk device, a magneto-optical disk device, a solid state drive (SSD), or a disk array device, for example.

The ROM 720 and the internal storage device 740 are non-transitory storage media. On the other hand, the RAM 730 is a transitory storage medium. Then, the CPU 710 is capable of operating based on a program stored in the ROM 720, the internal storage device 740, or the RAM 730. In other words, the CPU 710 is capable of operating by using a non-transitory storage medium or a transitory storage medium.

The IOC 750 intermediates data between the CPU 710, and an input device 760 and a display device 770. The IOC 750 is an IO interface card or a universal serial bus (USB) card, for example.

The input device 760 is a device that receives an input instruction from an operator of the information processing device 700. The input device 760 is a keyboard, a mouse, or a touch panel, for example.

The display device 770 is a device that displays information to an operator of the information processing device 700. The display device 770 is a liquid crystal display, for example.

The NIC 780 relays exchange of data with a not-illustrated external device via a network. The NIC 780 is a LAN card, for example.

The information processing device 700 configured as above can acquire an advantageous effect similar to that of the information processing device 20.

The reason is that the CPU 710 of the information processing device 700 is able to implement a function similar to that of the information processing device 20, based on a program.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2015-128768, filed on Jun. 26, 2015, the disclosure of which is incorporated herein in its entirety by reference.

The whole or part of the exemplary embodiments disclosed above can be described as, but not limited to, the following supplementary notes.

(Supplementary Note 1)

An information processing device includes:

dissimilarity a dissimilarity calculator that calculates dissimilarity that is a distance between first alert information including an already received first alert and information relevant to the first alert, and second alert information including a newly received second alert and information relevant to the second alert;

a machine learning generator that generates a classifier that determines a classification result that is a determination result of classification relating to detection of the first alert information by applying machine learning to the first alert information, and determines a classification result by applying the classifier to the second alert information; and a determiner that sets the determination result for the classification result of the second alert information and sets information indicating that presentation is unnecessary for information indicating presentation of the second alert information, when the determination result is false detection indicating erroneous detection and the dissimilarity is less than a predetermined threshold value, and sets information indicating that presentation is necessary for information indicating presentation of the second alert information, when the determination result is true detection indicating correct detection, or when the determination result is false detection indicating erroneous detection and the dissimilarity is equal to or more than a predetermined threshold value.

(Supplementary Note 2)

The information processing device according to supplementary note 1, wherein the machine learning generator, as the machine learning, extracts, as the first alert information to be applied to the machine learning, the first alert information for which the classification result determined by other than an own device is set, and generates the classifier, based on the classification result set for the extracted first alert information.

(Supplementary Note 3)

The information processing device according to supplementary note 2, wherein the machine learning generator calculates a first feature vector based on the extracted first alert information and generates the classifier by applying the calculated first feature vector to the machine learning, and calculates a second feature vector based on the second alert information and determines the classification result by applying the second feature vector to the classifier.

(Supplementary Note 4)

The information processing device according to supplementary note 2 or 3, wherein the determiner sets, to the second alert information, the determination result, when receiving the second alert information.

(Supplementary Note 5)

The information processing device according to any one of supplementary notes 1 to 4, wherein the dissimilarity calculator defines, as the dissimilarity, a distance in a predetermined rank order when a distance between the second alert information and a part or all pieces of the first alert information is arranged in ascending order.

(Supplementary Note 6)

The information processing device according to any one of supplementary notes 1 to 4, wherein the dissimilarity ns calculator calculates, as the dissimilarity, a degree of lowness of occurrence probability of communication information included in the second alert information with respect to a distribution of information included in communication information included in the first alert information.

(Supplementary Note 7)

The information processing device according to any one of supplementary notes 1 to 4, wherein the dissimilarity calculator calculates, as the dissimilarity, distribution information about the first alert information, and calculates a relationship of the second alert information for the calculated distribution information.

(Supplementary Note 8)

The information processing device according to any one of supplementary notes 1 to 4, wherein the dissimilarity calculator calculates, as the dissimilarity, a degree of lowness of occurrence probability of communication information included in the second alert information with respect to distribution of information included in communication information included in the first alert information.

(Supplementary Note 9)

The information processing device according to any one of supplementary notes 1 to 8, further includes:

a re-determiner that extracts third alert information for which the classification result is to be re-set from among the first alert information, calculates a feature vector of the third alert information, and re-determines the classification result of the third alert information by applying the feature vector of the third alert information to the classifier.

(Supplementary Note 10)

An information processing system includes:

the information processing device according to any one of supplementary notes 1 to 8; and a presentation device that includes an alert display that receives the first alert information from the information processing device and displays the classification result and the first alert information, and an inputter that receives an input to the classification result in the displayed alert information and transmits the input to the information processing device.

(Supplementary Note 11)

An information processing method includes:

calculating dissimilarity that is a distance between first alert information including an already received first alert and information relevant to the first alert, and second alert information including a newly received second alert and information relevant to the second alert;

generating a classifier that determines a classification result that is a determination result of classification relating to detection of the first alert information by applying machine learning to the first alert information;

determining a classification result by applying the classifier to the second alert information;

setting the determination result for the classification result of the second alert information and setting information indicating that presentation is unnecessary for information indicating presentation of the second alert information, when the determination result is false detection indicating erroneous detection and the dissimilarity is less than a predetermined threshold value; and setting information indicating that presentation is necessary for information indicating presentation of the second alert information, when the determination result is true detection indicating correct detection, or when the determination result is false detection indicating erroneous detection and the dissimilarity is equal to or more than a predetermined threshold value.

(Supplementary Note 12)

A computer readable non-transitory storage medium embodying a program, the program causing a computer to perform a method, the method includes:

calculating dissimilarity that is a distance between first alert information including an already received first alert and information relevant to the first alert, and second alert information including a newly received second alert and information relevant to the second alert;

generating a classifier that determines a classification result that is a determination result of classification relating to detection of the first alert information by applying machine learning to the first alert information;

determining a classification result by applying the classifier to the second alert information;

setting the determination result for the classification result of the second alert information and setting information indicating that presentation is unnecessary for information indicating presentation of the second alert information, when the determination result is false detection indicating erroneous detection and the dissimilarity is less than a predetermined threshold value; and setting information indicating that presentation is necessary for information indicating presentation of the second alert information, when the determination result is true detection indicating correct detection, or when the determination result is false detection indicating erroneous detection and the dissimilarity is equal to or more than a predetermined threshold value.

REFERENCE SINGS LIST

10 Information processing system
11 Information processing system
12 Information processing system
20 Information processing device
21 Machine learning unit
22 Dissimilarity calculating unit
23 Alert information storage unit
24 Re-determining unit
25 Dissimilarity calculating unit
26 Determining unit
30 Presentation device
40 Network
50 Monitoring device
60 Information processing device
70 Information processing device
90 Information processing device
500 Alert information
501 Detection time
502 Transmission-source IP address
503 Transmission-destination IP address
504 Detection rule identifier
505 Presentation flag
506 Classification result
507 Communication information
700 Information processing device
710 CPU
720 ROM
730 RAM
740 Internal storage device
750 IOC
760 Input device
770 Display device
780 NIC
790 Storage medium

What is claimed is:

1. An information processing device comprising:
a memory storing a program;
at least one processor configured to access the program stored in the memory and operate as instructed by the program, the at least one processor is configured to:
receive an alert from a monitoring device;
generate alert information including the alert and information relevant to the alert, the information relevant to the alert including a presentation flag and a classification result, the presentation flag being information representing whether the alert information is to be presented to an operator and the classification result being information indicating whether the alert information is correctly detected;
calculate a dissimilarity that is a distance between first alert information including a first alert and information relevant to the first alert, and second alert information including a second alert and information relevant to the second alert, the first alert being received prior to the second alert;
generate a classifier that determines whether the alert information is a true detection or a false detection, as a classification result;
determine a determination result of the second alert information by applying the classifier to the second alert information;
set the determination result to the classification result of the second alert information and set information indicating that a presentation is unnecessary to the presentation flag of the second alert information, when the determination result is the false detection and the dissimilarity is less than a predetermined threshold value;
set information indicating that the presentation is necessary to the presentation flag of the second alert information, when the determination result is the true detection, or when the determination result is the false detection indicating, and the dissimilarity is equal to or more than the predetermined threshold value; and
output the second alert information to a presentation device.

2. The information processing device according to claim 1, wherein the at least one processor is further configured to:
as a machine learning,
extract, as the first alert information to be applied to the machine learning, the first alert information for which the classification result determined by a device other than the information processing device, and generate the classifier, based on the classification result set for the extracted first alert information.

3. The information processing device according to claim 2, wherein the at least one processor is further configured to:
calculate a first feature vector based on the extracted first alert information and generate the classifier by applying the calculated first feature vector to the machine learning, and
calculate a second feature vector based on the second alert information and determine the classification result by applying the second feature vector to the classifier.

4. The information processing device according to claim 2, wherein the at least one processor is further configured to:
set, to the classification result of the second alert information, the determination result, when receiving the second alert information.

5. The information processing device according to claim 1, wherein the at least one processor is further configured to:
define, as the dissimilarity, a distance in a predetermined rank order when a distance between the second alert information and a part or all pieces of the first alert information is arranged in ascending order.

6. The information processing device according to claim 1, wherein the at least one processor is further configured to:
calculate, as the dissimilarity, a degree of lowness of occurrence probability of communication information included in the second alert information with respect to a distribution of information included in communication information included in the first alert information.

7. The information processing device according to claim 1, wherein the at least one processor is further configured to:
extract third alert information for which the classification result is to be re-set from among the first alert information,
calculate a feature vector of the third alert information, and
re-determine the classification result of the third alert information by applying the feature vector of the third alert information to the classifier.

8. An information processing system comprising:
the information processing device according to claim 1; and
the presentation device that
receives the second alert information from the information processing device, and displays the second alert information when the presentation flag of the second alert information is set to the information indicating that the presentation is necessary, and
receives an input to the classification result in the displayed alert information and transmits the input to the information processing device.

9. An information processing method comprising:
receiving an alert from a monitoring device;
generating alert information including the alert and information relevant to the alert, the information relevant to the alert including a presentation flag and a classification result, the presentation flag being information representing whether the alert information is to be presented to an operator, and the classification result being information indicating whether the alert information is correctly detected;
calculating a dissimilarity that is a distance between first alert information including a first alert and information relevant to the first alert, and second alert information including a second alert and information relevant to the second alert, the first alert being received prior to the second alert;
generating a classifier that determines whether the alert information is a true detection or a false detection, as the classification result;
determining a determination result of the second alert information by applying the classifier to the second alert information;
setting the determination result to the classification result of the second alert information and setting information indicating that a presentation is unnecessary to the presentation flag of the second alert information, when the determination result is the false detection and the dissimilarity is less than a predetermined threshold value;
setting information indicating that the presentation is necessary to the presentation flag of the second alert information, when the determination result is the true detection, or when the determination result is the false detection, and the dissimilarity is equal to or more than the predetermined threshold value; and
outputting the second alert information to a presentation device.

10. A computer readable non-transitory storage medium storing a program, the program causing a computer to perform a method, the method comprising:
receiving an alert from a monitoring device;
generating alert information including the alert and information relevant to the alert, the information relevant to the alert including a presentation flag and a classification result, the presentation flag being information representing whether the alert information is to be presented to an operator, and the classification result being information indicating whether the alert information is correctly detected;
calculating a dissimilarity that is a distance between first alert information including an a first alert and information relevant to the first alert, and second alert information including a second alert and information relevant to the second alert, the first alert being received prior to the second alert;
generating a classifier that determines whether the alert information is a true detection or a false detection, as the classification result;
determining a determination result of the second alert information by applying the classifier to the second alert information;
setting the determination result to the classification result of the second alert information and setting information indicating that presentation is unnecessary to the presentation flag of the second alert information, when the determination result is the false detection and the dissimilarity is less than a predetermined threshold value;
setting information indicating that presentation is necessary to the presentation flag of the second alert information, when the determination result is the true detection, or when the determination result is false detection indicating erroneous detection and the dissimilarity is equal to or more than the predetermined threshold value; and
outputting the second alert information to a presentation device.

* * * * *